United States Patent
Ueda et al.

(10) Patent No.: US 6,868,686 B2
(45) Date of Patent: Mar. 22, 2005

(54) REFRIGERATION CYCLE APPARATUS

(75) Inventors: Mitsuo Ueda, Hyogo (JP); Makoto Yoshida, Shiga (JP); Yuuichi Yakumaru, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/405,610

(22) Filed: Apr. 3, 2003

(65) Prior Publication Data

US 2003/0213256 A1 Nov. 20, 2003

(30) Foreign Application Priority Data

Apr. 4, 2002 (JP) ........................ 2002-102933

(51) Int. Cl.$^7$ ................................. F25B 1/00
(52) U.S. Cl. ..................... 62/228.4; 62/228.5; 62/229; 417/41.1
(58) Field of Search ............................ 62/228.1, 228.3, 62/228.4, 228.5, 229, 238.6, 6, 440; 417/44.1, 44.11, 45

(56) References Cited

U.S. PATENT DOCUMENTS

| | | | |
|---|---|---|---|
| 4,558,571 A | * 12/1985 | Yoshinaga et al. | 62/238.6 |
| 4,558,818 A | * 12/1985 | Harnish | 62/238.6 |
| 5,142,872 A | * 9/1992 | Tipton | 62/440 |
| 5,342,176 A | 8/1994 | Redlich | |
| 5,496,153 A | 3/1996 | Redlich | |
| 5,897,296 A | * 4/1999 | Yamamoto et al. | 62/132 |
| 5,980,211 A | * 11/1999 | Tojo et al. | 417/45 |
| 6,038,874 A | * 3/2000 | van der Walt et al. | 62/228.5 |
| 6,084,320 A | * 7/2000 | Morita et al. | 62/6 |
| 6,176,683 B1 | 1/2001 | Yang | |
| 6,501,240 B2 | * 12/2002 | Ueda et al. | 318/135 |
| 6,526,771 B2 | 3/2003 | Takano et al. | |
| 6,619,062 B1 | 9/2003 | Shibamoto et al. | |
| 6,623,246 B2 | * 9/2003 | Hwang et al. | 417/44.1 |
| 6,663,351 B2 | * 12/2003 | Joo | 417/53 |

FOREIGN PATENT DOCUMENTS

| | | |
|---|---|---|
| JP | 2-561 | 1/1990 |
| JP | 7-4763 | 1/1995 |
| JP | 8-508558 | 9/1996 |
| JP | 11-132585 | 5/1999 |
| JP | 11-173694 | 7/1999 |
| JP | 11-304270 | 11/1999 |
| JP | 2000121180 | 4/2000 |
| JP | 2001-165073 | 6/2001 |
| JP | 2001-260645 | 9/2001 |
| JP | 2002-89976 | 3/2002 |
| WO | 94/23204 | 10/1994 |

\* cited by examiner

*Primary Examiner*—Harry B. Tanner
(74) *Attorney, Agent, or Firm*—Wenderoth, Lind & Ponack L.L.P.

(57) ABSTRACT

A refrigeration cycle apparatus having a linear compressor is provided with a volume circulation rate instruction unit for obtaining a volume circulation rate Vco of a refrigerant in accordance with refrigerating capacity required of the refrigeration cycle apparatus, on the basis of an ambient temperature of an indoor heat exchanger (evaporator), a target temperature set on the evaporator by the user, and an ambient temperature of an outdoor heat exchanger (condenser). A volume circulation rate detector is provided for detecting a volume circulation rate Vcd of the refrigerant that actually circulates in a refrigerant circulation path of the refrigeration cycle apparatus; and an inverter is provided for generating an AC current for driving the linear compressor. The inverter is controlled so as to decrease a difference between the volume circulation rate Vco and the volume circulation rate Vcd.

17 Claims, 12 Drawing Sheets piston is at top dead point piston is at bottom dead point pressure in compression chamber reaches discharge pressure during compression

REFRIGERATION CYCLE APPARATUS

FIELD OF THE INVENTION

The present invention relates to a refrigeration cycle apparatus and, more particularly, a refrigeration cycle apparatus using a linear compressor which makes a piston in a cylinder reciprocate by a linear motor to generate a compressed gas of a refrigerant.

BACKGROUND OF THE INVENTION

Conventionally, a refrigeration cycle apparatus employing a linear compressor which utilizes a mechanical elastic member or elasticity of a compressed gas as equipment for generating a compressed gas of a refrigerant, has been known. Concrete applications for such refrigeration cycle apparatus include an air conditioner for cooling or heating a room to keep a comfortable room temperature, a refrigerator for keeping its interior at an appropriate low temperature, and the like.

FIG. 11 is a diagram for explaining a linear compressor using a spring as an elastic member, which is used in the conventional refrigeration cycle apparatus.

A linear compressor 1 includes a cylinder section 71a and a motor section 71b which are adjacent to each other along a predetermined axis line. In the cylinder section 71a, a piston 72 which is slidably supported along the axis direction is placed. Further, in the cylinder section 71a, a piston rod 72a, an end of which is fixed to the rear side of the piston 72, is placed, and a support spring (resonance spring) 81 which applies a force to the piston rod 72a in the axis direction is provided on the other end of the piston rod 72a.

Further, a magnet 73 is fixed to the piston rod 72a, and an electromagnet 74 comprising an outer yoke 74a and a stator coil 74b embedded in the outer yoke 74a is fixed to a portion of the motor section 71b which is opposed to the magnet 73. In this linear compressor 1, a linear motor 82 is constituted by the electromagnet 74, and the magnet 73 fixed to the piston rod 72a. The piston 72 reciprocates along its axis direction due to an electromagnetic force generated between the electromagnet 74 and the magnet 73, and elasticity of the spring 81.

Further, in the cylinder section 71a, a compression chamber 76 is formed, which is a closed space surrounded by a cylinder upper portion inner wall 75, a piston compression wall 72b, and a cylinder peripheral wall 77. An end of a gas inlet tube 10a for sucking a low-pressure refrigerant gas from a gas flow path into the compression chamber 76 is opened at the cylinder upper portion inner wall 75 and, further, an end of a gas discharge tube 10b for discharging a high-pressure refrigerant gas from the compression chamber, 76 to the gas flow path is opened at the cylinder upper portion inner wall 75. An inlet valve 79 and a discharge valve 80 for preventing back flow of the refrigerant gas are fixed to the end of the inlet tube 10a and the end of the discharge tube 10b, respectively.

In the linear compressor 1, when a driving current is supplied from a driving circuit (not shown) for the linear motor 82 to the linear motor 82, the piston 72 reciprocates in its axis direction, whereby suction of the low-pressure refrigerant gas into the compression chamber 76, compression of the gas in the compression chamber 76, and discharge of the compressed high-pressure gas from the compression chamber 76 are repeatedly carried out.

Meanwhile, as a method for controlling the refrigeration cycle apparatus, feedback control of the operation of the compressor which is a constituent of the refrigeration cycle apparatus on the basis of the thermal load condition of the apparatus is widely performed.

FIG. 12 is a diagram for explaining an example application for the refrigeration cycle apparatus, illustrating an air conditioner for cooling.

An air conditioner (refrigeration cycle apparatus) 50 is provided with an indoor unit 51 which is placed inside a room (indoor) to cool the room, and an outdoor unit 52 which is placed outside the room (outdoor) to discharge heat.

The indoor unit 51 includes an indoor heat exchanger (evaporator) 53 which performs heat exchange between the indoor air and the refrigerant, and absorbs heat from the indoor air; and a room temperature detector 54 which detects the temperature of the air to be sucked into the evaporator 53, i.e., the room temperature (the ambient temperature of the evaporator 53).

The outdoor unit 52 includes an outdoor heat exchanger (condenser) 55 which performs heat exchange between the outdoor air and the refrigerant, and discharges heat to the outside air; and a compressor 56 which is placed in a portion of a gas flow path Gp through which the refrigerant flows from the evaporator 53 to the condenser 55, sucks a low-temperature and low-pressure refrigerant gas from the evaporator 53 to compress the gas, and outputs a high-temperature and high-pressure gas to the condenser 55. Further, the outdoor unit 52 has an expansion valve 57 which is placed in a portion of a liquid flow path Lp through which the refrigerant flows from the condenser 55 to the evaporator 53, and reduces the pressure of a high-pressure liquid refrigerant so that the refrigerant evaporates at a lower temperature. In FIG. 12, Lmf indicates the direction along which the liquid refrigerant flows in the liquid flow path Lp, and Gmf indicates the direction along which the gas refrigerant flows in the gas flow path Gp.

Hereinafter, the functions of the condenser 55 and the evaporator 53 will be briefly described.

In the condenser 55, the high-temperature and high-pressure gas refrigerant flowing through the condenser 55 gradually loses heat and liquefies due to the air blown into the condenser 55, resulting in a high-pressure liquid refrigerant in the vicinity of the outlet of the condenser 55. This is equivalent to that the refrigerant radiates heat into the air to liquefy.

Further, the liquid refrigerant whose temperature and pressure are lowered by the expansion valve 57 flows into the evaporator 53. When the indoor air is blown into the evaporator 53 under this state, the liquid refrigerant takes a great amount of heat from the air and evaporates, resulting in a low-temperature and low-pressure gas refrigerant. The air which has lost a great amount of heat in the evaporator 53 is discharged as cool air from the blowoff port of the air conditioner.

As described above, in the air conditioner 50, a closed circuit for circulating the refrigerant is formed by the evaporator 53, the condenser 55, the gas flow path Gp and the liquid flow path Lp which are placed between the evaporator 53 and the condenser 55, the compressor 56 placed in the gas flow path Gp, and the expansion valve 57 placed in the liquid flow path Lp. The refrigerant sealed in the closed circuit is circulated by the compressor 56, whereby a known heat pump cycle is formed in the closed circuit.

As a method for controlling the amount of the circulating refrigerant, a method using a target temperature set on the air conditioner and the actual room temperature is generally employed (refer to Japanese Published Patent Application No. Hei. 9-68341).

FIG. 13 is a diagram for explaining a conventional refrigeration cycle control method for controlling an air conditioner for cooling.

In the conventional refrigeration cycle control method, the temperature inside the room cooled by the air conditioner (room temperature) is detected by an indoor unit suction temperature detector 60. As a concrete method for detecting the room temperature, a method of sensing the temperature of the indoor air by using a temperature sensor such as a thermocouple is used. Further, in a room temperature setting unit 61, a room temperature desired by the user is set as a target room temperature on the basis of an operation signal from the user. As a concrete method for setting a target temperature, a method of calculating a target temperature by processing a control signal from a remote controller of the air conditioner with a microcomputer is used. Then, a subtracter 63 calculates a temperature difference Tdiff between a room temperature Tdet detected by the indoor unit suction temperature detector 60 and a target temperature Tord set by the room temperature setting unit 61. A compressor rpm instruction unit 62 provides an instruction to the compressor 56 so that the rpm ωord of the compressor 56 becomes equal to an rpm according to the temperature difference Tdiff. To be specific, the rpm ωord of the compressor increases with an increase in the temperature difference Tdiff.

In the conventional refrigeration cycle control method, the rpm of the compressor 56 is changed in accordance with the difference between the temperature of the room to be cooled and the target temperature. Therefore, while highly efficient refrigeration cycle control can be carried out in a refrigeration cycle apparatus in which the amount of refrigerant circulating in the refrigeration cycle is set to a constant value according to the rpm of the compressor, it is difficult to carry out highly efficient refrigeration cycle control in a refrigeration cycle apparatus in which the refrigerant circulation amount is not determined by only the rpm of the compressor 56.

For example, in a compressor utilizing a conventional rotation type motor (rotation type compressor) such as a reciprocal compressor, a rotary compressor, or a scroll compressor, the volume of refrigerant to be compressed by one rotation of the motor is predetermined. Therefore, in a refrigeration cycle apparatus using such rotation type compressor, the amount of refrigerant that circulates in the refrigeration cycle is fixed to a constant value by the rpm of the motor of the compressor. Accordingly, in the rotation type compressor, highly efficient refrigeration cycle control can be carried out by controlling the rpm of the compressor.

On the other hand, in a refrigeration cycle apparatus using the above-described linear compressor, since the capacity of the compression chamber of the compressor varies, the volume of refrigerant to be compressed by one refrigerant compressing operation is not uniquely determined. Further, since the amount of refrigerant that remains in the compression chamber at the completion of the compressing operation is not constant, the amount of refrigerant circulating in the refrigeration cycle cannot be calculated from the stroke of the piston. As a result, the refrigeration cycle apparatus using the linear compressor cannot perform highly efficient refrigeration cycle control on the basis of the rpm of the compressor, i.e., the number of reciprocating motions of the piston per unit time.

SUMMARY OF THE INVENTION

The present invention is made to solve the above-described problems and has for its object to provide a refrigeration cycle apparatus using a linear compressor which can control the refrigerating capacity with high efficiency on the basis of a temperature difference between an actual temperature of a room or the like to be cooled or heated and a target temperature thereof.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a refrigeration cycle apparatus including a first heat exchanger and a second heat exchanger which form a circulation path for a refrigerant, and a linear compressor having a piston and a linear motor which makes the piston reciprocate, and a refrigerant is circulated in the circulation path due to the reciprocating motion of the piston. The apparatus comprises an inverter for generating an AC current for driving the linear motor; an actual circulation rate detector for detecting an actual refrigerant circulation rate indicating the volume of the refrigerant that is discharged from or sucked into the linear compressor per unit time by the reciprocating motion of the piston; a target circulation rate derivation unit for deriving a target refrigerant circulation rate indicating the volume of the refrigerant to be discharged from or sucked into the linear compressor per unit time, on the basis of an ambient temperature of at least one of the first heat exchanger and the second heat exchanger, and a target temperature that is set for at least one of the heat exchangers; and a controller for controlling the operation of the inverter so as to decrease a difference between the actual refrigerant circulation rate and the target refrigerant circulation rate. Therefore, the refrigerating capacity of the refrigeration cycle apparatus using the linear compressor can be controlled with high efficiency on the basis of the volume circulation rate of the refrigerant, as in the conventional refrigeration cycle device using a rotation-type compressor.

According to a second aspect of the present invention, the refrigeration cycle apparatus according to the first aspect further includes a stroke detector for detecting the stroke length of the reciprocating piston; and a top dead point detector for detecting the top dead point of the reciprocatingpiston. The actual circulation rate detector calculates the volume of the refrigerant that is discharged or sucked by each reciprocating motion of the piston, on the basis of the detected stroke length and the detected top dead point, and multiplies the calculated volume by the frequency of the AC current generated by the inverter, thereby to obtain the actual refrigerant circulation rate. Therefore, the refrigerating capacity of the refrigeration cycle apparatus can be efficiently controlled without using a sensor for measuring the volume circulation rate of the refrigerant.

According to a third aspect of the present invention, the refrigeration cycle apparatus according to the second aspect further includes a discharge pressure estimation unit for estimating the pressure of the refrigerant to be discharged from the linear compressor, on the basis of the temperature of the refrigerant in the heat exchanger for condensing the refrigerant, the estimation unit being positioned on the refrigerant discharge side of the linear compressor. A suction pressure estimation unit is further included for estimating the pressure of the refrigerant to be sucked into the linear compressor, on the basis of the temperature of the refrigerant in the heat exchanger for evaporating the refrigerant, the estimation unit being positioned on the refrigerant suction side of the linear compressor. The actual circulation rate detector performs an arithmetic operation using a pressure ratio between a maximum pressure and a minimum pressure of the refrigerant in the circulation path, which is obtained from the estimated pressure of the refrigerant to be sucked and the estimated pressure of the refrigerant to be discharged, and the detected stroke length and the detected top dead point, thereby to obtain the volume of the refrigerant to be discharged or sucked by each reciprocating motion of the piston. Therefore, even in a refrigeration cycle apparatus in which the pressure state (i.e., the pressure ratio between the refrigerant discharge pressure and the refrigerant suction pressure) varies according to the operating condition, the refrigerating capacity of the apparatus can be efficiently controlled on the basis of the volume circulation rate of the refrigerant.

According to a fourth aspect of the present invention, there is provided a refrigeration cycle apparatus having a first heat exchanger and a second heat exchanger which form a circulation path for a refrigerant, and a linear compressor having a piston and a linear motor which makes the piston reciprocate, and the refrigerant is circulated in the circulation path by the reciprocating motion of the piston. The apparatus comprises an inverter for generating an AC current for driving the linear motor; an actual circulation rate detector for detecting an actual refrigerant circulation rate indicating the weight of the refrigerant that is discharged from or sucked into the linear compressor per unit time by the reciprocating motion of the piston; a target circulation rate derivation unit for deriving a target refrigerant circulation rate indicating the weight of the refrigerant to be discharged from or sucked into the linear compressor per unit time, on the basis of an ambient temperature of at least one of the first heat exchanger and the second heat exchanger, and a target temperature that is set for at least one of the heat exchangers; and a controller for controlling the operation of the inverter so as to decrease a difference between the actual refrigerant circulation rate and the target refrigerant circulation rate. Therefore, the refrigerating capacity of the refrigeration cycle apparatus can be efficiently controlled on the basis of the temperature difference between the actual temperature of a room to be cooled and the target temperature thereof. Moreover, since the refrigerating capacity of the refrigeration cycle apparatus is controlled on the basis of the weight circulation rate of the refrigerant, which is closely related to the load on the apparatus, control of the refrigerating capacity can be carried out with higher responsivity and stability.

According to a fifth aspect of the present invention, the refrigeration cycle apparatus according to the fourth aspect further includes a stroke detector for detecting the stroke length of the reciprocating piston; a top dead point detector for detecting the top dead point of the reciprocating piston; and a discharge refrigerant concentration detector for detecting the concentration of the refrigerant discharged from the linear compressor. The actual circulation rate detector calculates the volume of the refrigerant that is discharged by each reciprocating motion of the piston, on the basis of the detected stroke length and the detected top dead point, and obtains the weight of the refrigerant that is discharged from the linear compressor per unit time, on the basis of the calculated volume, the detected concentration of the refrigerant, and the frequency of the AC current generated by the inverter. Therefore, sufficient control of the refrigerating capacity of the refrigeration cycle apparatus on the basis of the weight circulation rate of the refrigerant can be carried out using only a sensor for measuring the concentration of the discharged refrigerant, without using a sensor for measuring the weight circulation rate of the refrigerant.

According to a sixth aspect of the present invention, the refrigeration cycle apparatus according to the fifth aspect further includes a discharge temperature detector for detecting the temperature of the refrigerant discharged from the linear compressor; and a discharge pressure detector for detecting the pressure of the refrigerant discharged from the linear compressor. The discharge refrigerant concentration detector derives the concentration of the refrigerant discharged from the linear compressor, on the basis of the detected temperature and pressure of the refrigerant. Therefore, efficient control of the refrigerating capacity of the refrigeration cycle apparatus on the basis of the weight circulation rate of the refrigerant can be carried out without using a sensor for measuring the concentration of the discharged refrigerant.

According to a seventh aspect of the present invention, the refrigeration cycle apparatus according to the fourth aspect further includes a stroke detector for detecting the stroke length of the reciprocating piston; and a top dead point detector for detecting the top dead point of the reciprocating piston. The actual circulation rate detector calculates the volume of the refrigerant discharged by each reciprocating motion of the piston, on the basis of the detected stroke length and the detected top dead point, and obtains the weight of the refrigerant sucked into the linear compressor per unit time, on the basis of the calculated volume, the detected concentration of the refrigerant, and the frequency of the AC current generated by the inverter. Therefore, sufficient control of the refrigerating capacity of the refrigeration cycle apparatus on the basis of the weight circulation rate of the refrigerant can be carried out using only a sensor for measuring the concentration of the sucked refrigerant, without using a sensor for measuring the weight circulation rate of the refrigerant.

According to an eighth aspect of the present invention, the refrigeration cycle apparatus according to the seventh aspect further includes a suction temperature detector for detecting the temperature of the refrigerant sucked into the linear compressor; and a suction pressure detector for detecting the pressure of the refrigerant sucked into the linear compressor. The suction refrigerant concentration detector obtains the concentration of the refrigerant sucked into the linear compressor, on the basis of the detected temperature and pressure of the refrigerant. Therefore, sufficient control of the refrigerating capacity of the refrigeration cycle apparatus on the basis of the weight circulation rate of the refrigerant can be carried out without using a sensor for measuring the concentration of the sucked refrigerant.

According to a ninth aspect of the present invention, the refrigeration cycle apparatus according to the eighth aspect further includes a refrigerant temperature detector for detecting the temperature of the refrigerant in an evaporator which is a heat exchanger for evaporating the refrigerant, as a saturation temperature of the refrigerant sucked into the linear compressor, the detector being positioned at the refrigerant suction side of the linear compressor in the circulation path; and a super heat estimation unit for estimating the super heat of the refrigerant, which is a temperature difference between the temperature of the refrigerant sucked into the linear compressor and the saturation temperature thereof, on the basis of the operating state of the linear compressor. The suction temperature detector obtains the temperature of the temperature of the refrigerant sucked into the linear compressor, by adding the detected temperature of the refrigerant in the evaporator and the estimated degree of heating of the refrigerant. Therefore, sufficient control of the refrigerating capacity of the refrigeration cycle apparatus on the basis of the weight circulation rate of the refrigerant can be carried out without using a sensor for measuring the concentration of the sucked refrigerant and a sensor for measuring the temperature of the sucked refrigerant.

According to a tenth aspect of the present invention, in an air conditioner having a refrigeration cycle apparatus according to any of the first to ninth aspects, the first heat exchanger is an outdoor heat exchanger, and the second heat exchanger is an indoor heat exchanger. Therefore, an operation that disturbs comfort, such as excessive cooling or heating, can be avoided. For example, the room temperature can be brought to the set temperature in a shorter time. Further, since power (motor power) is not wasted during operation of the above-mentioned air conditioner, highly efficient operation of the air conditioner is realized.

According to an eleventh aspect of the present invention, in a refrigerator having a refrigeration cycle apparatus according to any of the first to ninth aspects, the first heat exchanger is a condenser for discharging heat, and the second heat exchanger is an evaporator for cooling the inside of the refrigerator. Therefore, an insufficient operating state such that the inside of the refrigerator is excessively cooled can be avoided. For example, the temperature in the refrigerator can be brought to the set temperature in a shorter time.

According to a twelfth aspect of the present invention, in a hot-water supply unit having a refrigeration cycle apparatus according to any of the first to ninth aspects, the hot-water supply unit includes a storage tank for storing water, the first heat exchanger is a water heat exchanger for heating the water stored in the tank, and the second heat exchanger is an air heat exchanger for absorbing heat from the surrounding atmosphere. Therefore, an insufficient operating state such that the hot-water supply unit excessively heats the water can be avoided. For example, the temperature of the water supplied from the hot-water supply unit can be brought to the set temperature in a shorter time.

According to a thirteenth aspect of the present invention, in a cryogenic freezer having a refrigeration cycle apparatus according to any of the first to ninth aspects, the cryogenic freezer includes a freezing chamber, the first heat exchanger is a heat radiator for radiating heat, and the second heat exchanger is a heat storage for cooling the inside of the freezing chamber. Therefore, a cryogenic freezer capable of highly accurate temperature control can be obtained.

DETAILED DESCRIPTION OF THE PREFERRED EMBODIMENTS

Hereinafter, preferred embodiments of the present invention will be described with reference to the drawings.

A refrigeration cycle apparatus according to the present invention uses a linear compressor as means for circulating a refrigerant. The circulation rate of the refrigerant in the refrigeration cycle apparatus (i.e., the volume or weight of the refrigerant to be discharged from or sucked into the linear compressor per unit time, hereinafter also referred to as volume circulation rate or weight circulation rate), is calculated, and the linear compressor is drive-controlled so that the calculated volume or weight becomes equal to a value corresponding to required refrigerating capacity, so as to perform speedy and stable control for the refrigeration cycle apparatus.

The linear compressor is controlled by controlling a driving current applied to a linear motor. As a concrete method for controlling the driving current, the amplitude, frequency, or waveform of the driving current may be changed so as to reduce a temperature difference between the ambient temperature of a heat exchanger such as a condenser or an evaporator and a set temperature (target temperature) that is set for the heat exchanger.

[Embodiment 1]

Figure 1:
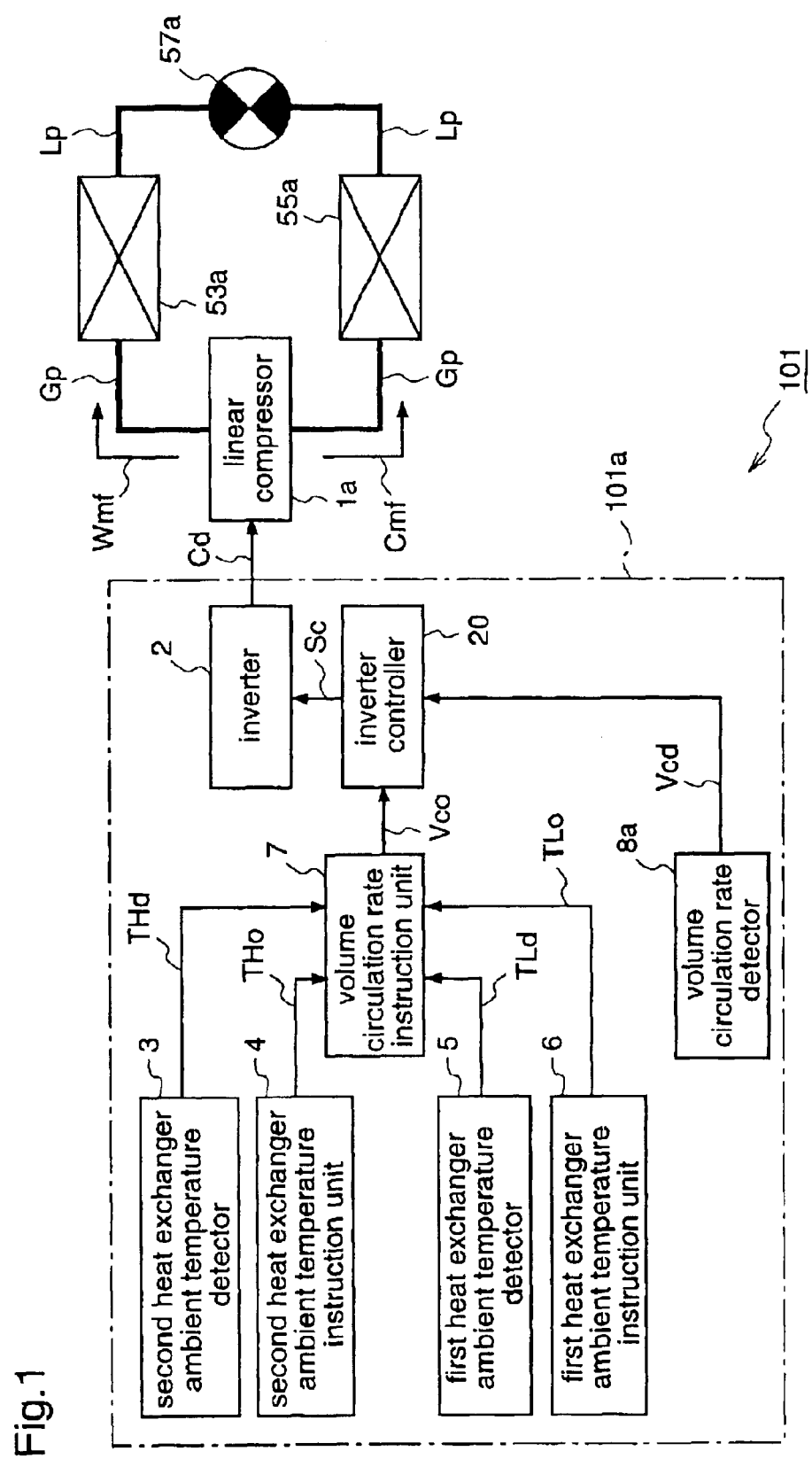
FIG. 1 is a block diagram for explaining a refrigeration cycle apparatus according to a first embodiment of the present invention.

FIG. 1 is a diagram for explaining a refrigeration cycle apparatus according to a first embodiment of the present invention.

Figure 8:
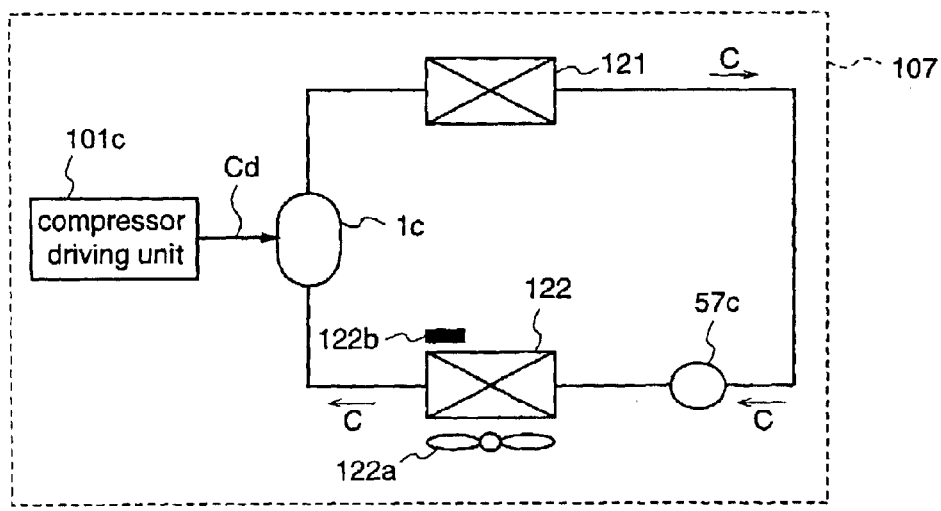
FIG. 8 is a schematic diagram illustrating a refrigerator according to a seventh embodiment of the present invention.

A refrigeration cycle apparatus 101 according to the first embodiment of the invention is an air conditioner for cooling a room, and it is provided with, like the conventional air conditioner 50 shown in FIG. 8, a first heat exchanger (evaporator) 53a and a second heat exchanger (condenser) 55a which form a refrigerant circulation path (refrigeration cycle). A linear compressor 1a is placed in a gas flow path Gp connecting both heat exchangers; and a restrictor 57a is placed in a liquid f low pa th Lp connecting both heat exchangers.

Figure 11:
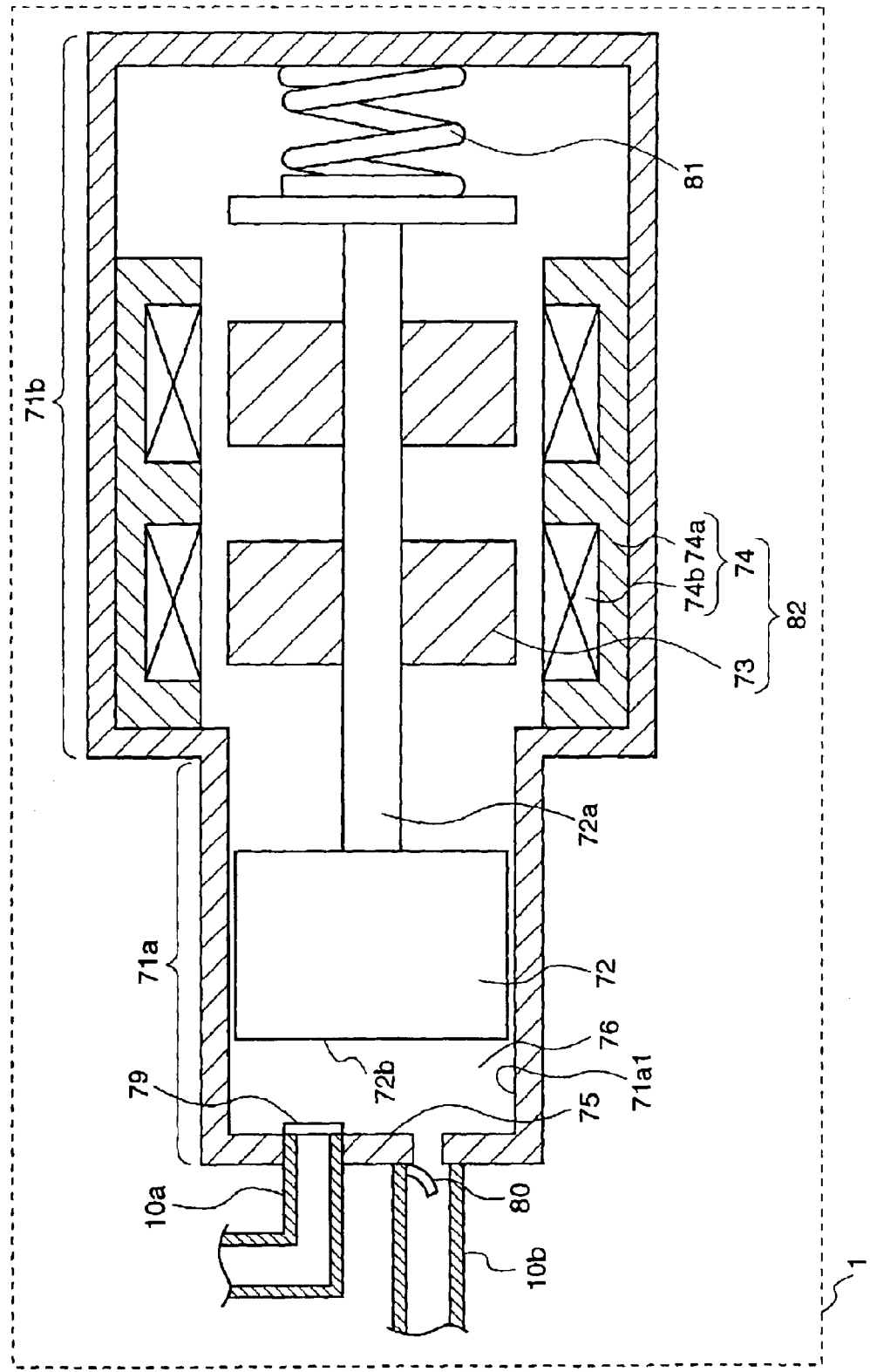
FIG. 11 is a cross-sectional view for explaining a conventional linear compressor.
Figure 12:
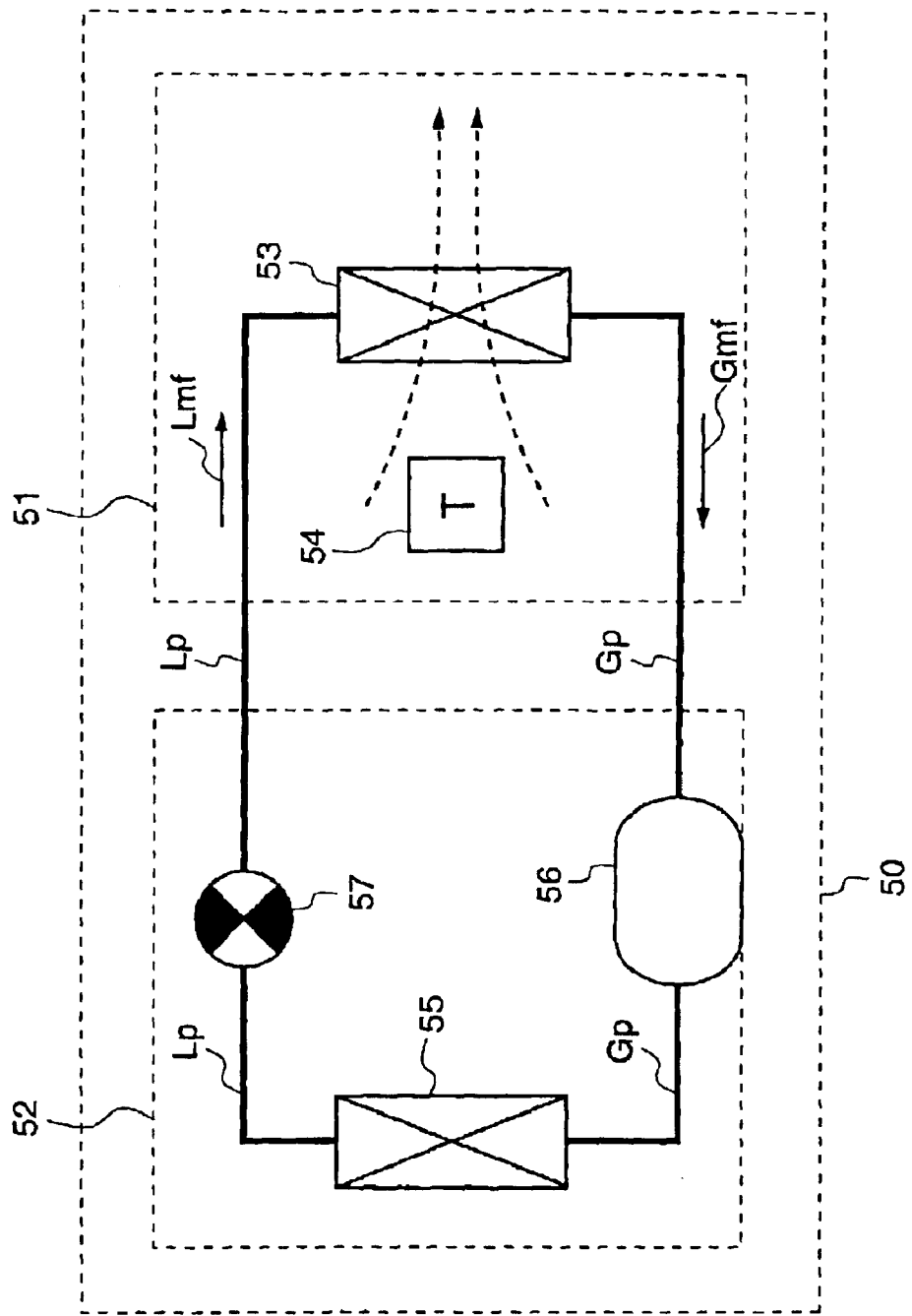
FIG. 12 is a system diagram for explaining a common refrigeration cycle apparatus.
Figure 13:
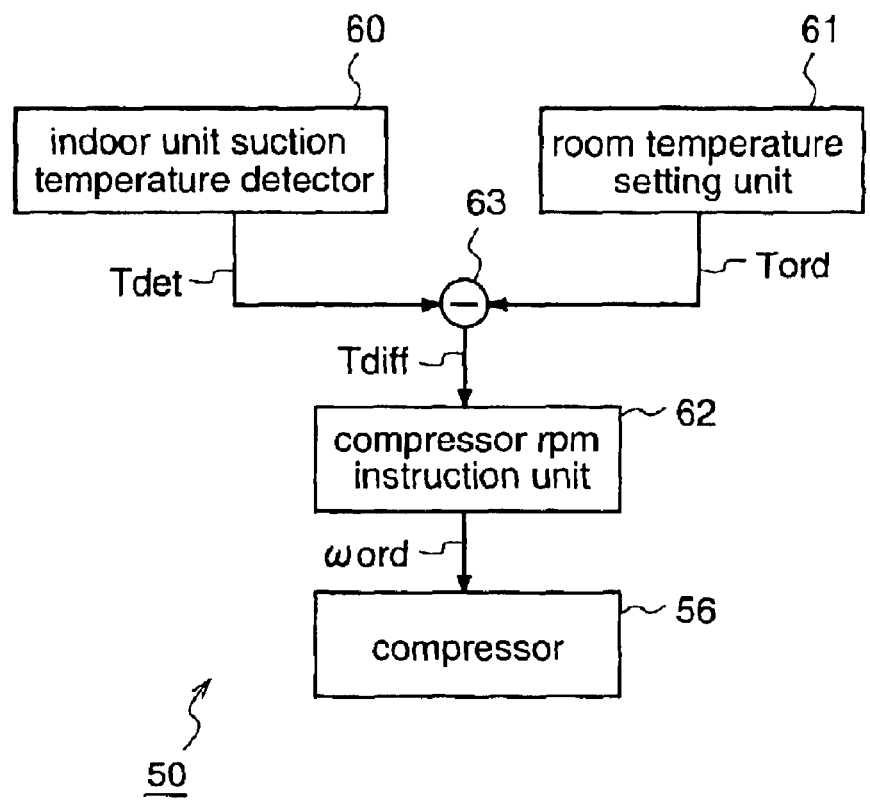
FIG. 13 is a block diagram for explaining a system for controlling refrigerating capacity of a conventional refrigeration cycle apparatus using a linear compressor.

The linear compressor 1a is identical to the linear compressor 1 shown in FIG. 11. That is, the linear compressor 1a has a cylinder section 71a including a piston 72, and a motor section 71b including a linear motor 82 for making the piston 72 reciprocate. The linear compressor has a compression chamber 76 formed, in part, by a wall 72b of piston 72 so that the volume of the compression chamber 76 can change based on reciprocating motion of the piston 72, and the refrigerant is circulated in the refrigerant circulation path by the reciprocating motion of the piston 72.

Further, the refrigeration cycle apparatus 101 has a compressor driving unit 101a for applying a driving current Cd to the linear motor 82 of the linear compressor 1a to drive the linear compressor 1a.

Hereinafter, the compressor driving unit 101a will be described.

The compressor driving unit 101a has temperature detectors 3 and 5 for detecting the state of load applied to the refrigeration cycle apparatus 101. The temperature detector 3 is a second heat exchanger ambient temperature detector which detects a temperature THd of ambience surrounding the second heat exchanger (condenser) 55a (ambient temperature), and outputs a detection signal indicating the detected temperature. The temperature detector 5 is a first heat exchanger ambient temperature detector which detects a temperature TLd of ambience surrounding the first heat exchanger (evaporator) 53a (ambient temperature), and outputs a detection signal indicating the detected temperature.

Any detector may be used as the temperature detectors 3 and 5 so long as it can detect the ambient temperature of the heat exchanger to output temperature information. For example, a mechanical thermometer using a bimetal, a thermal expansion thermometer, a magnetic thermometer, an electric thermometer using a thermocouple, a resistance thermometer, a thermister thermometer, a semiconductor thermometer, a radiation thermometer, and an optical thermometer can be employed. Further, the temperature detectors 3 and 5 are not restricted to those detecting the ambient temperatures surrounding the heat exchangers. The temperature detectors 3 and 5 may detect the radiant heat in the vicinity of the heat exchangers.

The compressor driving unit 101a has temperature instruction units 4 and 6 for instructing the driving state of the refrigeration cycle apparatus. The temperature instruction unit 4 is a second heat exchanger ambient temperature instruction unit which outputs an instruction signal indicating a target temperature (order temperature) THo that is set for the second heat exchanger (condenser) 55a by the user. The temperature instruction unit 6 is a first heat exchanger ambient temperature instruction unit which outputs an instruction signal indicating a target temperature (order temperature) TLo that is set for the first heat exchanger (evaporator) 53a by the user. The target temperature set for the condenser 55a is a target value of the ambient temperature of the condenser 55a, and the target temperature set for the evaporator 53a is a target value of the ambient temperature of the evaporator 53a.

Since the refrigeration cycle apparatus 101 is an air conditioner for cooling a room, usually it is not necessary for the user to set a target value of the ambient temperature of the second heat exchanger 55a, and therefore, the temperature instruction unit 4 is unnecessary. However, when the heat (exhaust heat) discharged from the second heat exchanger of the air conditioner during the cooling operation is used for a hot-water supply system or the like, the temperature instruction unit 4 is utilized for outputting an instruction signal indicating a target temperature (temperature set by the user) THo of hot water to be supplied from the hot-water supply system. Further, the instruction signal outputted from the temperature instruction unit 6 is, for example, a digital instruction signal indicating a set temperature (target temperature) of the first heat exchanger, which is output from a microcomputer embedded in the remote controller of the air conditioner. However, the instruction signal outputted from the temperature instruction unit 6 is not restricted to such digital instruction signal. It may be an analog instruction signal outputted from a rotary switch for performing temperature setting, which is fixed to the air conditioner.

The compressor driving unit 101a includes a volume circulation rate instruction unit 7 which calculates refrigerating capacity required of the refrigeration cycle apparatus (i.e., the amount of heat exchange to be carried out per unit time) on the basis of the temperature information outputted from the temperature detectors 3 and 5 and the temperature instruction unit 6, and outputs an instruction signal (refrigerant circulation rate information) indicating a volume circulation rate Vco of the refrigerant in accordance with the calculated refrigerating capacity (i.e., the volume of the refrigerant to be discharged from or sucked into the linear compressor 1a per unit time). The compressor driving unit 101a also includes a volume circulation rate detector 8a which detects a volume circulation rate Vcd of the refrigerant that actually flows in the refrigerant circulation path of the refrigeration cycle apparatus (i.e., the volume of the refrigerant that is actually discharged from or sucked into the linear compressor 1a per unit time), and outputs a detection signal (refrigerant circulation rate information) indicating the volume circulation rate.

A positive displacement flowmeter for measuring a rate of volumetric flow of the refrigerant that flows in the refrigerant circulation path is used as the volume circulation rate detector 8a.

Further, as a concrete method for calculating a volume circulation rate by the volume circulation rate instruction unit 7, there is usually employed a method (first method) of calculating a volume circulation rate required of the refrigeration cycle apparatus, on the basis of a temperature difference between a detected temperature (i.e., a temperature detected by the temperature detector) and an order temperature (i.e., a target temperature indicated by the instruction signal from the temperature instruction unit).

However, the required cooling efficiency substantially differs between the case where the air conditioner is placed in a small room and the case where it is placed in a large room. For example, even when the above-mentioned temperature difference in the small room is equal to that in the large room, the cooling efficiency required for the large room is higher than that for the small room.

So, there is proposed a second method for calculating a volume circulation rate, in which the amount of change in the temperature difference between the detected temperature and the order (target) temperature in every predetermined period of time (in other words, the amount of change in the detected temperature in every predetermined period of time) is fed back to an arithmetic operation for calculating a required volume circulation rate. To be specific, this second method is used to correct the required volume circulation rate that is obtained by the first method, on the basis of the size of a thermal load (actually, the size of the room to be cooled) that is obtained from the amount of change in the detected temperature for every predetermined period of time.

Further, as a concrete method for calculating a volume circulation rate by the volume circulation rate instruction unit 7, there may be employed a third method of calculating a required volume circulation rate by using, not a feedback loop as in the second method, but an open loop with a matrix table in which a volume circulation rate is assigned to each combination of a detected temperature value and an order temperature value.

The compressor driving unit 101a is provided with an inverter 2 for generating an AC current Cd to be supplied as a driving current to the linear motor of the linear compressor 1a; land an inverter controller 20 for controlling the operation of the inverter 2 so that a difference between the volume circulation rate indicated by the instruction signal Vco from the volume circulation rate instruction unit 7 and the volume circulation rate Vcd indicated by the detection signal from the volume circulation rate detector 8a becomes zero.

Hereinafter, a method for controlling the linear compressor will be described.

The linear motor of the linear compressor 1a is driven by a single phase AC current or a DC-superposed AC current, and the linear compressor 1a is efficiently driven by using a resonance phenomenon of an elastic member such as a spring or a gas. Therefore, the driving frequency of the linear compressor (i.e., the number of vibrations in the piston reciprocating motion) is almost constant.

So, some methods for controlling the refrigerant circulation rate in the refrigeration cycle apparatus utilizing the linear compressor are proposed as follows.

First of all, there is a method of controlling the circulation rate of the refrigerant to be discharged from or sucked into the linear compressor 1a by changing the amplitude of the AC current outputted from the inverter 2.

Further, when the driving current of the inverter 2 is a DC-superposed AC current, the refrigerant circulation rate can be increased by controlling the level of the DC current so that the center position of vibration of the piston in the linear compressor 1a approaches the cylinder head, and the refrigerant circulation rate may be decreased by controlling the level of the DC current so that the center position of vibration of the piston goes away from the cylinder head. Furthermore, the volume circulation rate may be controlled by changing both of the amplitude of the AC current and the level of the DC current.

Furthermore, when the resonance frequency of the linear compressor 1a has a predetermined frequency band width, the volume circulation rate of the refrigerant can be changed by changing the frequency of the output current from the inverter 2. Moreover, it is also possible to change the volume circulation rate of the refrigerant by changing the waveform of the AC current outputted from the inverter 2.

Next, the operation of the refrigeration cycle apparatus will be described.

When the AC current Cd generated by the inverter 2 is applied to the linear motor of the linear compressor 1a, the linear motor is driven, and the piston starts to reciprocate. Thereafter, when the driving state of the linear compressor 1a is stabilized, the linear compressor 1a goes into the resonance driving state wherein the piston reciprocating motion is in the resonance state, under the constant load condition. The number of vibrations of the piston reciprocating motion at this time matches the frequency of the AC current Cd.

As described above, when the linear compressor 1a is driven and thus the refrigerant circulates in the circulation path of the refrigeration cycle apparatus, the second heat exchanger (evaporator) 55a discharges heat to the air due to liquefaction of the refrigerant. On the other hand, the first heat exchanger (evaporator) 53a absorbs heat from the ambience due to vaporization of the refrigerant. At this time, the refrigerant circulates in the refrigerant circulation path, passing through the linear compressor 1a, the second heat exchanger 55a, the restrictor 57a, the first heat exchanger 53a, and the linear compressor 1a in this order. In FIG. 1, Cmf denotes the direction in which the refrigerant circulates in the refrigerant circulation path when the refrigeration cycle apparatus 101 of the first embodiment performs cooling operation.

Hereinafter, concrete control of the linear compressor of the refrigeration cycle apparatus 101 will be described.

During operation of the air conditioner (refrigeration cycle apparatus) 101, the temperature detector 5 detects the ambient temperature of the first heat exchanger 53a, and the heat detector 3 detects the ambient temperature of the second heat exchanger 55a. The respective heat detectors 3 and 5 output detection signals indicating the detected ambient temperatures (detected temperatures) THd and TLd, and these signals are input to the volume circulation rate instruction unit 7. Further, the temperature instruction unit 6 outputs an instruction signal indicating a target temperature (order temperature) that is set for the first heat exchanger 53a (i.e., a room temperature TLo set by the user), and the instruction signal indicating the temperature TLo is input to the volume circulation instruction unit 7.

In this first embodiment, as described above, since no target temperature is set on the second heat exchanger 55a, the output from the temperature instruction unit 4 is not used for control of the linear compressor. However, when the exhaust heat that is discharged during cooling operation of the refrigeration cycle apparatus is utilized in a hot-water supply system or the like, the temperature instruction unit 4 outputs an instruction signal indicating a target temperature (order temperature) THo of hot water to be supplied from the hot-water supply system, which temperature is set by the user.

As described above, when the detection signals from the temperature detectors 3 and 5 and the instruction signal from the temperature instruction unit are input to the volume circulation rate instruction unit 7, the volume circulation rate instruction unit 7 performs arithmetic operation to calculate a volume circulation rate Vco of the refrigerant, which is required of the refrigeration cycle apparatus, on the basis of a temperature difference between the detected temperature TLd and the order temperature TLo, and the detected temperature THd. Thereafter, an instruction signal indicating the calculated volume circulation rate Vco (circulation rate information) is supplied to the inverter controller 20.

Generally, during the cooling operation of an air conditioner, the higher the detected temperature (actual room temperature) TLd with respect to the order temperature (target temperature) TLo is, the higher the refrigerant circulation rate required of the refrigeration cycle is. Further, when the ambient temperature of the outdoor unit (condenser) is decreased, the load on the refrigeration cycle becomes smaller, and the required refrigerant circulation rate is lowered. Conversely, when the ambient temperature of the outdoor unit is increased, the load on the refrigeration cycle becomes larger, and the required refrigerant circulating rate is increased. Further, as described above, when the exhaust heat discharged from the refrigeration cycle apparatus is utilized in a hot-water supply system, the lower the detected temperature THd with respect to the order temperature THo is, the higher the refrigerant circulation rate required of the refrigeration cycle is.

During operation of the air conditioner (refrigeration cycle apparatus) 101, the volume of the refrigerant that actually circulates in the refrigerant circulation path (volume circulation rate Vcd) is detected by the volume circulation rate detector 8a, and a detection signal indicating the volume circulation rate Vcd (circulation rate information) is supplied to the inverter controller 20.

Then, the inverter controller 20 supplies a control signal Sc to the inverter 2, on the basis of the volume circulation rate Vco calculated by the volume circulation rate instruction unit 7, and the volume circulation rate Vcd detected by the volume circulation rate detector 8a. In the inverter 2, the operation of generating an AC current is controlled by the control signal Sc so as to decrease a difference between the calculated volume circulation rate Vco and the detected volume circulation rate Vcd.

For example, the larger the difference between the required volume circulation rate Vco and the actual volume circulation rate Vcd is, the larger the amplitude of the AC current Cd generated by the inverter 2 becomes. As a result, in the linear compressor 1a, the stroke length of the reciprocating piston is increased. In other words, the volume of the compression chamber of linear compressor 19 is varied by adjusting the stroke length of the piston, to thereby adjust the circulation rate.

Thereby, the refrigerant circulation rate in the refrigeration cycle is increased, and the heat exchange rate per unit time is increased, whereby the ambient temperature TLd of the evaporator 53a approaches the set temperature (target temperature) TLo.

As described above, according to the first embodiment of the invention, the refrigeration cycle apparatus 101 using the linear compressor 1a is provided with the volume circulation rate instruction unit 7 for calculating the volume circulation rate Vco of the refrigerant in accordance with the refrigeration capacity required of the refrigeration cycle apparatus on the basis of the ambient temperature of the indoor heat exchanger (evaporator) 53a, the target temperature set on the evaporator 53a by the user, and the ambient temperature of the outdoor heat exchanger (condenser) 55a; and the volume circulation rate detector 8a for detecting the volume circulation rate Vcd of the refrigerant that is actually circulating in the refrigerant circulation path of the refrigeration cycle apparatus. The inverter 2 for generating a driving current (AC current) for the linear compressor 1a is controlled so as to decrease a difference between the volume circulation rate Vco and the volume circulation rate Vcd, whereby the refrigerating capacity of the refrigeration cycle apparatus can be controlled with high efficiency on the basis of the difference between the actual room temperature and the target temperature thereof.

Furthermore, in this first embodiment, since the volume circulation rate Vco required of the refrigeration cycle apparatus is calculated on the basis of the outdoor temperature (ambient temperature of the second heat exchanger 55a) as well as the indoor temperature (ambient temperature of the first heat exchanger 53a), the calculated volume circulation rate can be a value more suitable to the operating state.

Further, while in this first embodiment the ambient temperatures of the first and second heat exchangers are detected, the refrigeration cycle apparatus 101 may detect only the ambient temperature of the first heat exchanger 53a. In this case, the temperature detector 3 for detecting the ambient temperature of the second heat exchanger 55a is dispensed with.

Further, while in this first embodiment a positive displacement flowmeter for measuring the volume flow rate of the refrigerant is used as the volume circulation rate detector 8a, the volume circulation rate detector 8a is not restricted thereto. For example, it may be a differential pressure flowmeter which estimates the flow rate of the refrigerant on the basis of the pressure difference that occurs in the refrigerant flowing in the refrigerant circulation path. Further, it may be a flowmeter for measuring the flow rate of liquid, such as an area flowmeter, a turbine flowmeter, a vortex flowmeter, a ultrasonic flowmeter, or an electromagnetic flowmeter.

Furthermore, while in this first embodiment the refrigeration cycle apparatus is an air conditioner performing cooling, it may be an air conditioner performing heating. In this case, the first heat exchanger 53a operates as a condenser while the second heat exchanger 55a operates as an evaporator, and the user sets a target value of the ambient temperature of the first heat exchanger 53a operating as a condenser.

Hereinafter, control of the linear compressor in the case where the refrigeration cycle apparatus is an air conditioner performing heating will be briefly described. Also in this case, no target temperature is set on the second heat exchanger 55a, and the temperature instruction unit 4 does not output an instruction signal indicating a target temperature (order temperature) THo.

The temperature detectors 3 and 5 detect the ambient temperatures of the heat exchangers 53a and 55a, and output detection signals indicating the detected temperatures THd and TLd, respectively. The temperature instruction unit 6 outputs a target temperature (order temperature) for the first heat exchanger (i.e., an instruction signal indicating the room temperature TLo set by the user).

The volume circulation rate instruction unit 7 performs arithmetic operation to calculate a volume circulation rate Vco required of the refrigeration cycle apparatus on the basis of the detected temperatures TLd and THd, and the order temperature TLo, and outputs a detection signal indicating the calculated volume circulation rate Vco (circulation rate information) to the inverter controller 20.

As described above, in the air conditioner performing heating operation, the lower the detected temperature TLd with respect to the order temperature TLo is, the larger the refrigerant circulation rate required of the refrigeration cycle is. Further, in this air conditioner, when the ambient temperature of the outdoor unit is increased, the load on the refrigeration cycle becomes smaller, and the required refrigerant circulation rate is lowered. Conversely, when the ambient temperature of the outdoor unit is decreased, the load on the refrigeration cycle becomes larger, and the required refrigerant circuit rate is increased.

Then, in the air conditioner (refrigeration cycle apparatus), the volume of the refrigerant that is actually circulating in the refrigerant circulation path (volume circulation rate Vcd) is detected by the volume circulation rate detector 8a, and an instruction signal indicating the volume circulation rate Vcd (circulation rate information) is supplied to the inverter controller 20. The operation of the inverter 2 is controlled by the control signal Sc from the inverter controller 20 so as to decrease a difference between the calculated volume circulation rate Vco and the detected volume circulation rate Vcd.

Also in the air conditioner performing heating operation, like the air conditioner performing cooling operation, the inverter 2 for generating the driving current (AC current) for the linear compressor 1a is controlled so as to decrease the difference between the required volume circulation rate Vco and the actual volume circulation rate Vcd. Therefore, the refrigerating capacity of the refrigeration cycle apparatus can be controlled with high efficiency on the basis of the difference between the actual indoor temperature and the target temperature thereof.

While in this first embodiment the refrigeration cycle apparatus is an air conditioner, the refrigeration cycle apparatus is not restricted thereto, and it may be a refrigerator, a hot-water supply unit, or a cryogenic freezer.

[Embodiment 2]

Figure 2:
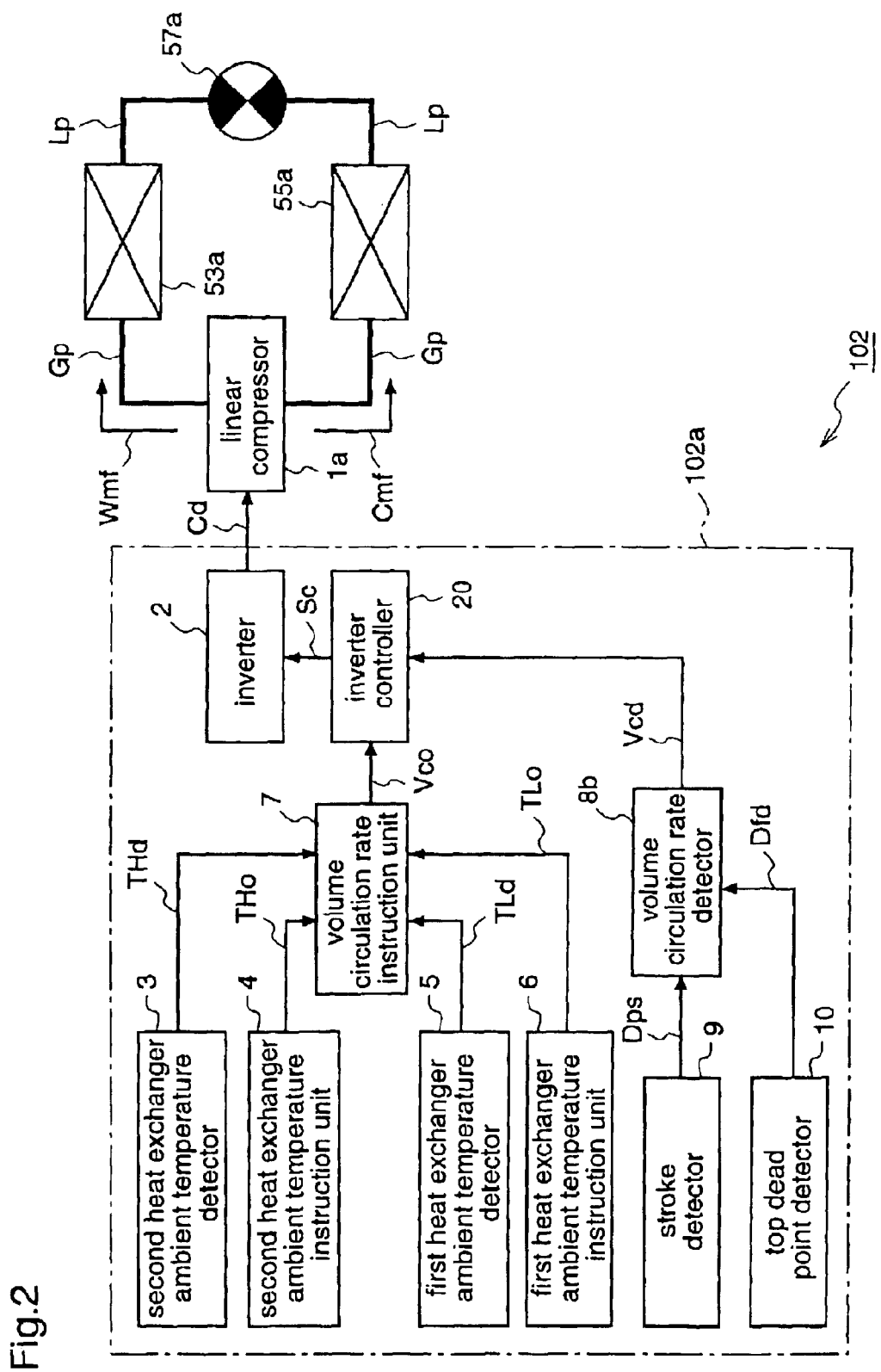
FIG. 2 is a block diagram for explaining a refrigeration cycle apparatus according to a second embodiment of the present invention.

FIG. 2 is a block diagram for explaining a refrigeration cycle apparatus according to a second embodiment of the present invention.

A refrigeration cycle apparatus 102 according to the second embodiment is provided with, instead of the compressor driving unit 101a of the first embodiment, a compressor driving unit 102a which detects the actual volume circulation rate in a manner different from that of the compressor driving unit 101a. The other constituents of the apparatus 102 are identical to those of the first embodiment.

To be specific, the compressor driving unit 102a includes a second heat exchanger ambient temperature detector 3, a first heat exchanger ambient temperature detector 5, a second heat exchanger ambient temperature instruction unit 4, a first heat exchanger ambient temperature instruction unit 6, a volume circulation rate instruction unit 7, an inverter 2, and an inverter controller 20, like the compressor driving unit 101a of the first embodiment.

The compressor driving unit 102a includes a stroke detector 9 which detects the stroke length of the piston that reciprocates in the linear compressor 1a, and outputs a detection signal indicating the detected stroke length Dps (stroke information); a top dead point detector 10 which detects the top dead point of the piston that reciprocates in the linear compressor 1a (i.e., a piston position Dfd in which the piston is closest to the cylinder head), and outputs a detection signal indicating the detected top dead point (top dead point information); and a volume circulation rate detector 8b which calculates the actual volume circulation rate Vcd of the refrigerant that flows in the refrigerant circulation path of the refrigeration cycle apparatus 102.

The stroke detector 9 and the top dead point detector 10 are implemented by contact type position sensors. However, these detectors may be implemented by non-contact type position sensors, such as an eddy current type gap sensor or a working transformer using two coils. Further, the stroke length and top dead point of the piston may be estimated from the values of the current and voltage which are applied to the linear compressor.

Next, the operation of the refrigeration cycle apparatus 102 will be described.

The refrigeration cycle apparatus 102 according to the second embodiment is different from the first embodiment only in the operation for calculating the actual volume circulation rate of the refrigerant. Hereinafter, the operation for calculating the actual volume circulation rate will be mainly described.

When it is assumed that there is no leakage of the refrigerant when the refrigerant is compressed in the linear compressor 1a, the state change of the refrigerant is an adiabatic change. Assuming that the pressure of the refrigerant is P, the volume is V, and the ratio of specific heat is γ, formula (1) holds as follows.

$$P \times V_\gamma = \text{constant} \tag{1}$$

The ratio of specific heat γ is the ratio of isopiestic specific heat CP to isovolumic specific heat CV of the refrigerant, and it depends on the type of refrigerant.

Next, a description will be given of a method for obtaining the volume of the refrigerant to be discharged from the linear compressor 1a by one reciprocating motion of the piston.

Figure 3A:
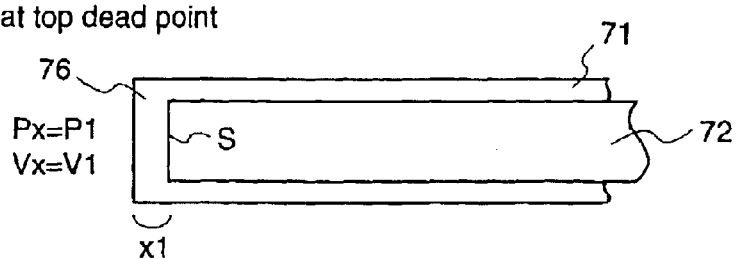
FIGS. 3(a)-3(c) are diagrams for explaining a method for calculating a refrigerant circulation rate from the top dead point and stroke of a piston in a linear compressor, in the refrigeration cycle apparatus according to the second embodiment.
Figure 3B:
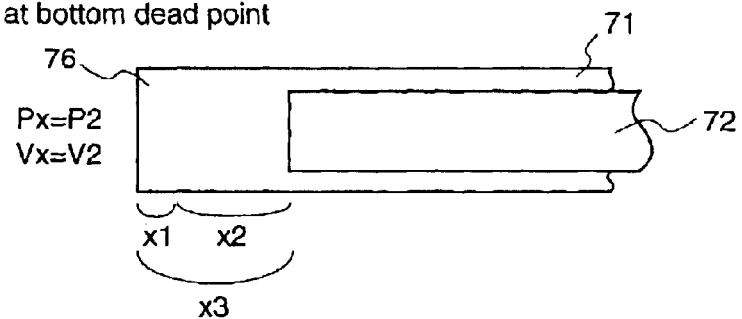

FIG. 3 is a diagram illustrating the position of the piston 72 in the cylinder 71. To be specific, FIG. 3(a) shows the state where the piston 72 is positioned at the top dead point (i.e., the piston 72 is closest to the cylinder head), and FIG. 3(b) shows the state where the piston 72 is positioned at the bottom dead point (i.e., the piston 72 is most distant from the cylinder head).

When the piston 72 is positioned at the top dead point as shown in FIG. 3(a), the pressure Px of the refrigerant in the compression chamber 76 becomes P1[Pa]. Further, when the piston 72 is positioned at the top dead point under the state where the refrigerant is circulating in the refrigeration cycle (refrigerant circulation path), the inner pressure Px of the compression chamber 76 is increased to a pressure Pd[Pa] (discharge pressure) at which the refrigerant is discharged from the linear compressor. Therefore, the pressure P1[Pa] of the refrigerant when the piston is positioned at the top dead point is equal to the discharge pressure Pd[Pa].

Further, the volume Vx of the compression chamber 76 is minimum when the piston 72 is positioned at the top dead point, and the volume V1[m3] of the compression chamber at this time can be obtained as the product of the cross-sectional area S[m2] of the piston, and the spacing x1[m] between the cylinder head inner surface and the piston compression surface when the piston 72 is positioned at the top dead point.

As shown in FIG. 3(b), when the piston 72 is positioned at the bottom dead point, the pressure Px of the refrigerant in the compression chamber becomes P2[Pa]. Further, when the piston is positioned at the bottom dead point under the state where the refrigerant is circulating in the refrigeration cycle, the pressure Px in the compression chamber is decreased to the pressure Ps[Pa] (suction pressure) at which the refrigerant is sucked into the linear compressor. Therefore, the refrigerant pressure P2[Pa] when the piston is positioned at the bottom dead point is equal to the suction pressure Ps[Pa].

Further, the volume Vx of the compression chamber becomes maximum when the piston 72 is positioned at the bottom dead point, and the volume V2 [m3] of the compression chamber at this time can be obtained from the product of the cross-sectional area S[m2] of the piston, and the spacing x3 [m] between the cylinder head inner surface and the piston compression surface when the piston 72 is positioned at the bottom dead point. The spacing x3 [m] is the sum of the spacing x1[m] and the piston stroke length x2[m].

Figure 3C:
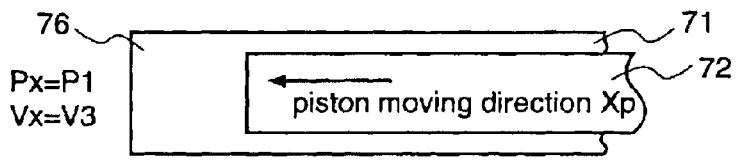

As shown in FIG. 3(c), when the piston starts to move from its bottom dead point toward the cylinder head, the linear compressor goes into the compression state. At this time, the volume Vx of the compression chamber starts to decrease, and the pressure Px in the compression chamber starts to increase from the suction pressure P2. When the pressure Px in the compression chamber is increased to reach the discharge pressure P1, the discharge valve of the linear compressor 1a opens, and discharge of the refrigerant is started. The volume Vx of the compression chamber at this time is V3.

In the compress ion process of the linear compressor, while the piston moves from the bottom dead point (refer to FIG. 3(b)) to the discharge valve opening position (refer to FIG. 3(c)), the refrigerant in the compression chamber adiabatically changes, and equation (2) holds as follows.

$$P2 \times V2_\gamma = P1 \times V3_y \tag{2}$$

Accordingly, the volume of the refrigerant to be discharged is obtained as follows.

$$V3 - V1 = (P2/P1)1/_\gamma \times V2 - V1 \tag{3}$$

On the other hand, assuming that the volume of the compression chamber when the pressure Px in the compression chamber has reached the suction pressure Ps in the suction process of the linear compressor is V4 [m3], the volume of the refrigerant to be sucked is obtained as follows.

$$V2-V4 = V2 - (P1/P2)1/_{\gamma}V1 \quad (4)$$

In this second embodiment, as the pressure ratio of the discharge pressure to the suction pressure (P1/P2) in equations (3) and (4), a representative value for driving the refrigeration cycle is employed.

Further, since, in the linear compressor 1a, the piston reciprocates at the same frequency as that of the inputted driving current, the number of reciprocating motions of the piston per unit time matches the frequency of the output current from the inverter.

Accordingly, in the volume circulation rate detector 8b, the volume of the refrigerant to be discharged by one piston reciprocating motion, which is obtained by equation (3), is multiplied by the frequency of the inverter, whereby the volume of the refrigerant to be discharged from the linear compressor per unit time is obtained. Further, in the volume circulation rate detector 8b, the volume of the refrigerant to be sucked by one piston reciprocating motion, which is obtained by equation (4), is multiplied by the frequency of the inverter output, whereby the volume of the refrigerant to be sucked into the linear compressor per unit time is obtained.

Then, the volume circulation rate detector 8b outputs a detection signal indicating the volume Vcd of the refrigerant to be discharged from or sucked into the linear compressor per unit time (circulation rate information), as an actual refrigerant circulation rate. When this detection signal is supplied to the inverter controller 20, the inverter controller 20 outputs a control signal Sc for controlling the inverter 2. Then, the AC current generating operation of the inverter 2 is controlled on the basis of the control signal Sc so as to decrease the difference between the required volume circulation rate Vco and the actual volume circulation rate Vcd.

As described above, the refrigeration cycle apparatus according to the second embodiment is provided with the stroke detector 9 for detecting the stroke length of the piston that reciprocates in the linear compressor 1a; and the top dead point detector 10 for detecting the top dead point of the piston that reciprocates in the linear compressor 1a. In this construction, the actual volume circulation rate of the refrigerant that circulates in the refrigeration cycle is calculated on the basis of the stroke length and top dead point of the piston, and the frequency of the AC current outputted from the inverter 2, which is the driving current for the linear compressor 1a. Therefore, as described for the first embodiment, the refrigerating capacity of the refrigeration cycle apparatus using the linear compressor can be controlled with high efficiency on the basis of the difference between the actual temperature of the room to be cooled and the target temperature thereof. Moreover, a fluid sensor for measuring the actual volume circulation rate can be dispensed with.

In this second embodiment, when calculating the volume of the refrigerant to be discharged from or sucked into the linear compressor 1a, a typical value for driving the refrigeration cycle is used as a pressure ratio of the discharge pressure to the suction pressure (P1/P2). However, this pressure ratio may be obtained by actually measuring the refrigerant discharge pressure and suction pressure. In this case, even when a refrigeration cycle apparatus in which the pressure state varies according to the driving condition and thus the ratio of the discharge pressure to the suction pressure varies, is employed, the refrigerating capacity of the refrigeration cycle apparatus can be efficiently controlled on the basis of the volume circulation rate of the refrigerant.

There is a method of obtaining a value of discharge pressure as a pressure at which the refrigerant is saturated, from the temperature of the heat exchanger that is placed on the discharge side of the compressor and acts as a condenser, between the first heat exchanger and the second heat exchanger constituting the refrigeration cycle. Further, there is a method of obtaining a value of suction pressure as a pressure at which the refrigerant is saturated, from the temperature of the heat exchanger that is placed on the suction side of the compressor and acts as an evaporator, between the first heat exchanger and the second heat exchanger constituting the refrigeration cycle.

That is, when a refrigerant fluid is heated under a predetermined pressure, the temperature of the fluid gradually increases, and the fluid comes to a boil when it reaches a certain temperature. In this state, even when the refrigerant fluid is further heated, the temperature is kept constant until the fluid is completely evaporated. On the other hand, when a refrigerant gas is cooled under a predetermined pressure, the temperature of the gas gradually decreases, and the gas starts to condense when it reaches a certain temperature. In this state, even when the refrigerant gas is further cooled, the temperature is kept constant until the gas is completely condensed. In this way, the temperature of the refrigerant which is kept constant even when the refrigerant is heated or cooled is the saturation temperature, and the pressure of the refrigerant at this time is the saturation pressure. Usually, the pressure of the refrigerant is kept constant in the evaporator or the condenser, and the refrigerant is in the saturated state where the fluid and the steam are mixed. Further, the relationship between the temperature (saturation temperature) and the pressure (saturation pressure) of the refrigerant in the saturated state depends on the refrigerant. Accordingly, when the saturation temperature of the refrigerant can be measured, the saturation pressure can be obtained.

[Embodiment 3]

Figure 4:
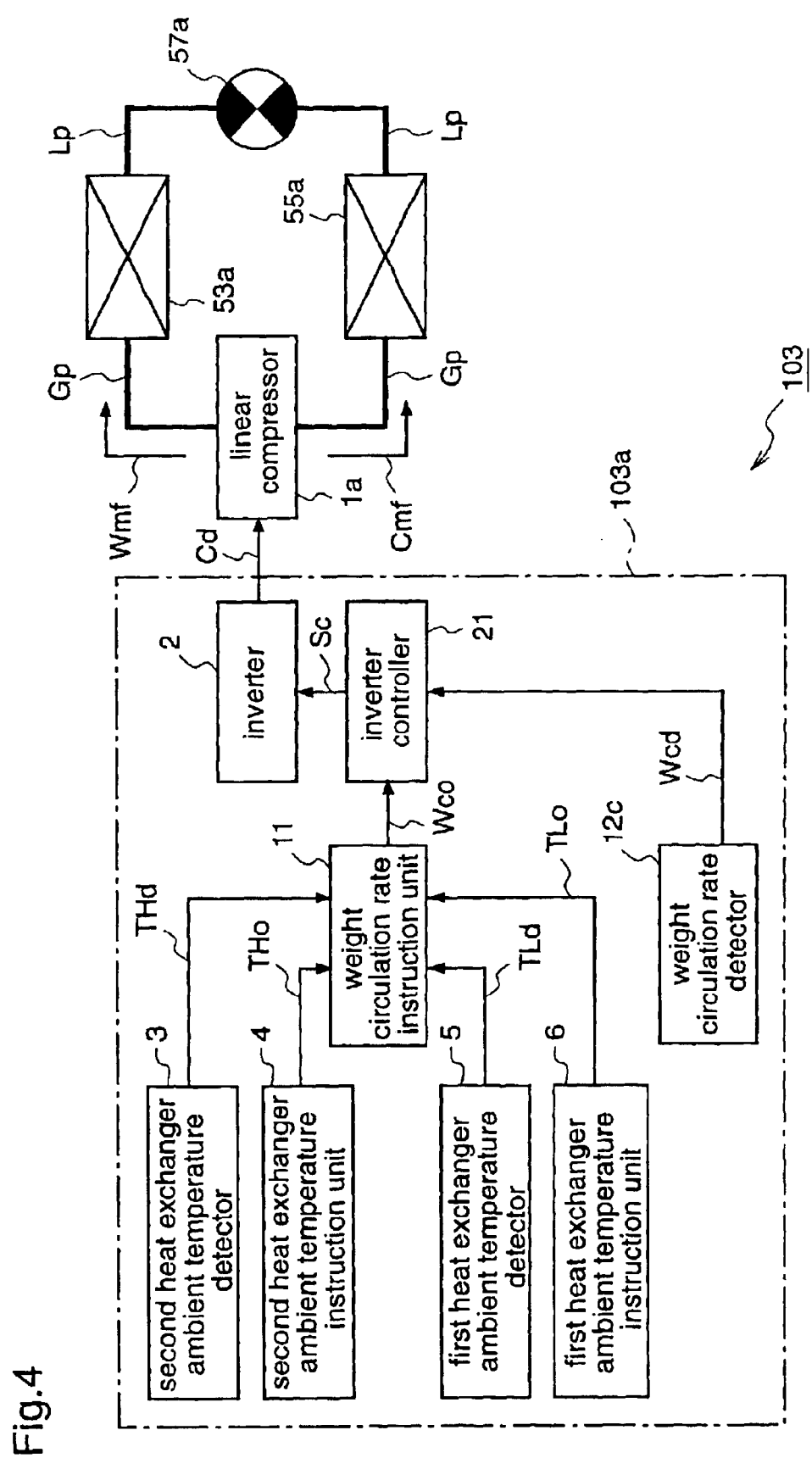
FIG. 4 is a block diagram for explaining a refrigeration cycle apparatus according to a third embodiment of the present invention.

FIG. 4 is a block diagram for explaining a refrigeration cycle apparatus according to a third embodiment of the present invention, illustrating a linear compressor driving unit as a component of the refrigeration cycle apparatus.

A refrigeration cycle apparatus 103 according to the third embodiment is provided with a linear compressor driving unit 103a for drive-controlling the linear compressor 1a on the basis of the weight circulation rate of the refrigerant per unit time (hereinafter also referred to simply as weight circulation rate), instead of the linear compressor driving unit 101a of the first embodiment for drive-controlling the linear compressor 1a on the basis of the volume circulation rate of the refrigerant per unit time (hereinafter also referred to simply as volume circulation rate). The other components are identical to those of the refrigeration cycle apparatus 101 of the first embodiment.

To be specific, the refrigeration cycle apparatus 103 is an air conditioner for cooling a room, like the refrigeration cycle apparatus 101 of the first embodiment. The refrigeration cycle apparatus 101 includes a first heat exchanger (evaporator) 53a and a second heat exchanger (condenser) 55a which constitute a refrigerant circulation path (refrigeration cycle); a linear compressor 1a which is placed in a gas flow path Gp connecting both heat exchangers; and an expansion valve 57a which is placed in a liquid flow path Lp connecting both heat exchangers.

The linear compressor driving unit 103a includes an inverter 2 for generating an AC current as a driving current for the linear compressor; a temperature detector 3 for detecting the ambient temperature of the second heat exchanger; a temperature instruction unit 4 for instructing an ambient temperature of the second heat exchanger; a temperature detector 5 for detecting the ambient temperature of the first heat exchanger; and a temperature instruction unit 6 for instructing an ambient temperature of the first heat exchanger.

The linear compressor driving unit 103a further includes a weight circulation rate instruction unit 11 which calculates refrigerating capacity required of the refrigeration cycle on the basis of the outputs from the respective temperature detectors 3 and 5 and the temperature instruction unit 4, and outputs an order signal indicating a weight circulation rate Wco of the refrigerant (circulation rate information) in accordance with the calculated refrigerating capacity; a weight circulation rate detector 12c which detects the weight circulation rate of the refrigerant that actually flows in the refrigeration cycle (refrigerant circulation path), and outputs a detection signal indicating the actual weight circulation rate Wcd of the refrigerant (circulation rate information); and an inverter controller 21 which controls the inverter 2 for generating the driving current (AC current) Id of the linear compressor 1a so that a difference between the actual circulation rate Wcd and the required circulation rate Wco becomes zero. The weight circulation rate detector 12c is implemented by a Coriolis mass flowmeter for measuring a mass flow rate (i.e., a mass of the refrigerant that flows in the refrigeration cycle per unit time).

In this third embodiment, no target temperature is set for the second heat exchanger 55a as in the first embodiment, and therefore, the output from the temperature instruction unit 4 is not used for control of the linear compressor. However, when the exhaust heat discharged during cooling operation of the refrigeration cycle apparatus is utilized in a hot-water supply system or the like, the temperature instruction unit 4 outputs an instruction signal indicating a target temperature (order temperature) HLo of the hot water to be supplied from the hot-water supply system, which temperature is set by the user, to a weight circulation rate instruction unit 11.

Next, the operation of the refrigeration cycle apparatus 103 will be described.

In this third embodiment, the refrigerating capacity required of the refrigeration cycle apparatus 103 is controlled on the basis of the weight circulation rate of the refrigerant, while it is controlled on the basis of the volume circulation rate of the refrigerant in the first embodiment. Accordingly, a description will be hereinafter given of the operation for drive-controlling the linear compressor of the refrigeration cycle apparatus on the basis of the weight circulation rate of the refrigerant.

Under the state where the linear compressor 1a is driven by the linear compressor driving unit 103a, the refrigerant circulates in the refrigerant circulation path, and the respective heat exchangers perform heat exchange, the respective temperature detectors 3 and 5 detect the ambient temperatures of the second heat exchanger (condenser) 55a and the first heat exchanger (evaporator) 53a, respectively, to output detection signals indicating the detected ambient temperatures (temperature information) to the weight circulation rate instruction unit 11. Further, the temperature instruction unit 6 outputs an order signal (temperature information) indicating a target temperature that is set by the user for the first heat exchanger (evaporator) 53a (i.e., a target value of the ambient temperature of the evaporator 53a), and the order signal is supplied to the weight circulation rate instruction unit 11.

In the weight circulation rate instruction unit 11, a weight circulation rate that is required of the refrigeration cycle apparatus 103 is calculated on the basis of the temperature information (detection signals) from the temperature detectors 3 and 5 as well as the temperature information (order signal) from the temperature instruction unit 6, and an order signal (circulation rate information) indicating the calculated weight circulation rate Wco is output to the inverter controller 21. In the weight circulation rate instruction unit 11, arithmetic processing for calculating the weight circulation rate is carried out while feeding back the amount of change in the temperature difference between the detected temperature TLd and the order temperature TLo per unit time. That is, a required weight circulation rate is uniquely calculated on the basis of the difference between the detected temperature TLd and the order temperature TLo, and the detected temperature THd, and the calculated weight circulation rate is corrected on the basis of the amount of change in the temperature difference between the detected temperature TLd and the order temperature TLo for every predetermined period of time. An order signal indicating the corrected weight circulation rate is supplied to the inverter controller 21.

Further, in the weight circulation rate detector 12c, the actual weight circulation rate of the refrigerant that flows in the circulation path is measured by a measuring instrument such as a Coriolis mass flowmeter, and a detection signal indicating the measured actual weight circulation rate (circulation rate information) is output to the inverter controller 21.

Then, the inverter controller 21 outputs a control signal Sc to the inverter 2. In the inverter 2, the AC current generating operation is controlled on the basis of the control signal Sc so as to decrease the difference between the required weight circulation rate Wco and the actual weight circulation rate Wcd.

As described above, according to the third embodiment of the invention, the refrigeration cycle apparatus 103 using the linear compressor 1a is provided with the weight circulation rate instruction unit 11 for calculating a weight circulation rate Wco of the refrigerant in accordance with the refrigerating capacity required of the refrigeration cycle apparatus, on the basis of the ambient temperature of the indoor heat exchanger (evaporator) 53a, the target room temperature set by the user, and the ambient temperature of the outdoor heat exchanger (condenser) 55a; the weight circulation rate detector 12c for detecting the actual weight circulation rate Wcd of the refrigerant that flows in the refrigerant circulation path of the refrigeration cycle apparatus; and an inverter 2 for generating an AC current for driving the linear compressor 1a. In the apparatus so constructed, the inverter 2 is controlled to reduce a difference between the required weight circulation rate Wco and the actual weight circulation rate Wcd, whereby the refrigerating capacity of the refrigeration cycle apparatus can be efficiently controlled on the basis of the difference between the actual temperature of the room to be cooled and the target temperature thereof. Moreover, since, in this third embodiment, the refrigerating capacity of the refrigeration cycle apparatus is controlled on the basis of the weight circulation rate of the refrigerant, which is closely related to the load on the apparatus, the refrigerating capacity can be controlled with higher responsivity and stability.

Furthermore, in this third embodiment, the weight circulation rate Wco of the refrigerant which is required of the refrigeration cycle apparatus is calculated on the basis of the outdoor temperature (the ambient temperature of the condenser) as well as the indoor temperature (the ambient temperature of the evaporator). Therefore, the calculated value of the weight circulation rate required of the refrigeration cycle apparatus becomes more adaptable to the operating state.

While in this third embodiment the weight circulation rate instruction unit 11 calculates a required weight circulation rate while feeding back a change in the temperature difference between the detected temperature and the order temperature, the weight circulation rate instruction unit 11 may calculate a required weight circulation rate by using, not a feedback loop as mentioned above, but an open loop with a matrix table on which a weight circulation rate is assigned to each combination of a detected temperature value and an order temperature value.

Further, while in this third embodiment the weight circulation rate detector 12c is implemented by a Coriolis mass flowmeter for measuring a mass flow rate, the weight circulation rate detector 12c may be implemented by a measuring instrument such as a thermal type mass flowmeter with the same effects as described above.

Furthermore, while in this third embodiment the refrigeration cycle apparatus is an air conditioner for cooling a room, the refrigeration cycle apparatus of this third embodiment may be an a ir conditioner for heating a room, a refrigerator, a hot-water supply system, a cryogenic freezer, or the like, as described for the first embodiment.

[Embodiment 4]

Figure 5:
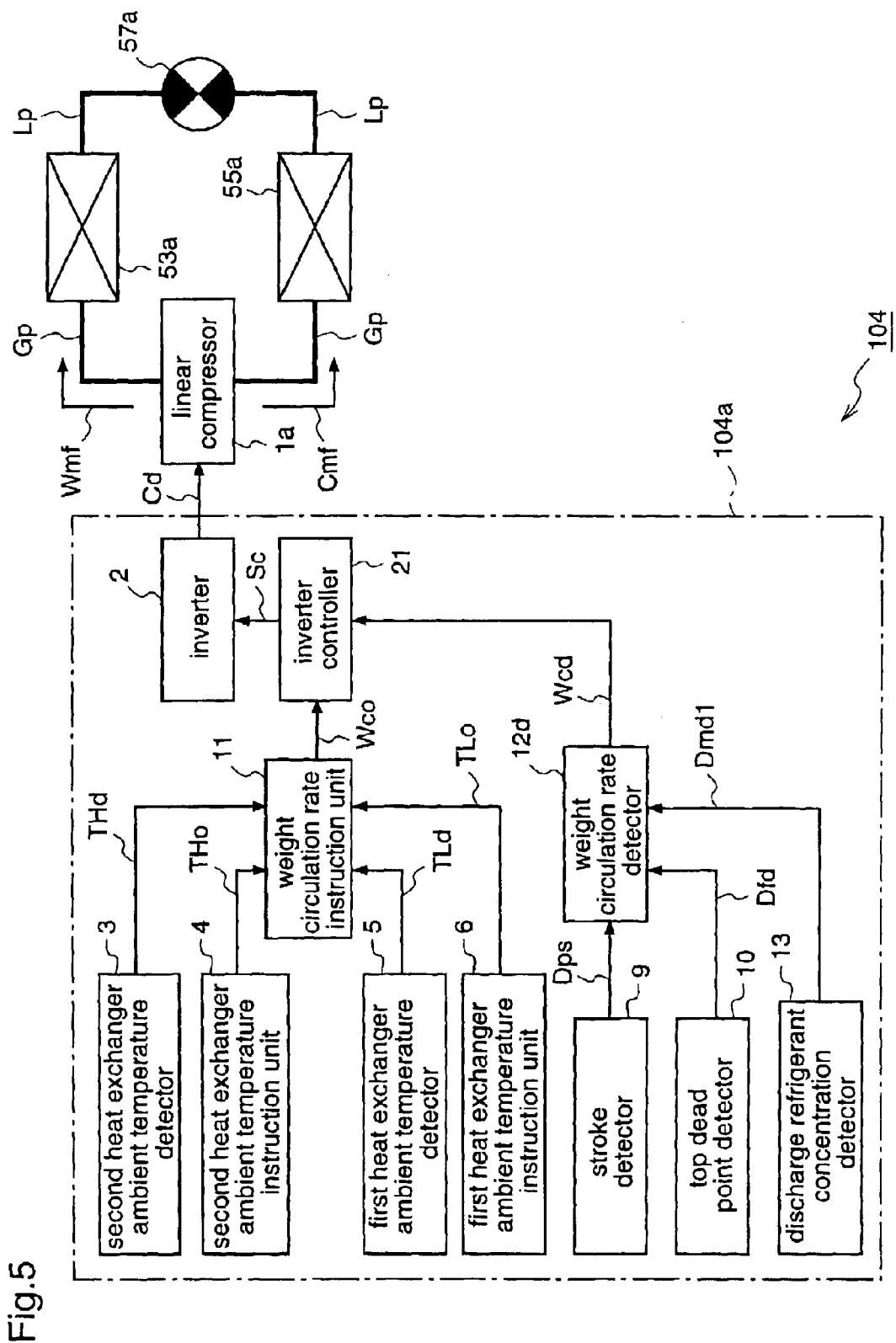
FIG. 5 is a block diagram for explaining a refrigeration cycle apparatus according to a fourth embodiment of the present invention.

FIG. 5 is a block diagram for explaining a refrigeration cycle apparatus according to a fourth embodiment of the present invention.

A refrigeration cycle apparatus 104 according to the fourth embodiment is provided with a compressor driving unit 104a which detects the weight circulation rate of the refrigerant using a method different from the method employed by the compressor driving unit 103a of the third embodiment. The other constituents are identical to those described for the third embodiment.

To be specific, the compressor driving unit 104a includes a second heat exchanger ambient temperature detector 3, a first heat exchanger ambient temperature detector 5, a second heat exchanger ambient temperature instruction unit 4, a first heat exchanger ambient temperature instruction unit 6, a weight circulation rate instruction unit 11, an inverter 2, and an inverter controller 21, like the compressor driving unit 103a of the third embodiment.

The compressor driving unit 104a further includes a stroke detector 9 for detecting the stroke length of the piston that reciprocates in the linear compressor 1a, and outputting a detection signal indicating the detected stroke length Dps (stroke information); a top dead point detector 10 for detecting the top dead point of the piston that reciprocates in the linear compressor 1a (i.e., the piston position Dfd when the piston is closest to the cylinder head), and outputting a detection signal indicating the detected top dead point (top dead point information); a discharge refrigerant concentration detector 13 for detecting the concentration Dmd1 of the refrigerant discharged from the linear compressor 1a; and a weight circulation rate detector 12d for calculating the actual weight circulation rate Wcd of the refrigerant that flows in the refrigerant circulation path of the refrigeration cycle apparatus. The discharge refrigerant concentration detector 13 is implemented by a concentration sensor using an optical fiber. Further, the stroke detector 9 and the top dead point detector 10 are implemented by contact-type position sensors as described for the second embodiment. However, these detectors may be implemented by non-contact type position sensors such as an eddy current type gap sensor or an actuating transformer using two coils. Alternatively, these detectors may estimate the piston stroke length and the top dead point from the values of the current and voltage applied to the linear compressor.

Next, the operation of the refrigeration cycle apparatus 104 according to the fourth embodiment will be described.

The refrigeration cycle apparatus 104 is different from the refrigeration cycle apparatus 103 of the third embodiment only in the operation of calculating the actual weight circulation rate of the refrigerant that flows in the refrigerant circulation path. Hereinafter, the operation of calculating the actual weight circulation rate will be mainly described.

The stroke detector 9 detects the piston stroke length Dps in the operating linear compressor 1a, and outputs a detection signal indicating the detected stroke length (stroke information) to the weight circulation rate detector 12d. Further, the top dead point detector 10 detects the piston top dead point Dfd in the operating linear compressor 1a, and outputs a detection signal indicating the detected top dead point (top dead point information) to the weight circulation rate detector 12. Further, the discharge refrigerant concentration detector 13 detects the concentration Dmd1 of the refrigerant discharged from the linear compressor 1, and outputs a detection signal indicating the detected refrigerant concentration (concentration information) to the weight circulation rate detector 12d.

Then, the weight circulation rate detector 12d obtains the volume of the refrigerant to be discharged per piston reciprocating motion, on the basis of the piston stroke length Dps and the top dead point Dfd, in a manner similar to the volume circulation rate detector 8b of the refrigeration cycle apparatus 102 according to the second embodiment. Further, the weight circulation rate detector 12d performs multiplication of the obtained volume of the refrigerant to be discharged per piston reciprocating motion by the detected discharge refrigerant concentration Dms1, thereby to calculate the weight of the refrigerant to be discharged per piston reciprocating motion. Then, the weight circulation rate detector 12d performs multiplication of the weight of the refrigerant to be discharged per piston reciprocation motion by the frequency of the inverter to obtain the weight Wcd of the refrigerant to be discharged from the linear compressor per unit time, and outputs a detection signal indicating the discharge refrigerant weight (circulation rate information) to the inverter controller 21. Then, the inverter controller 21 outputs a control signal Sc to the inverter 2, and the AC current generating operation of the inverter 2 is controlled on the basis of the control signal Sc so as to decrease the difference between the required weight circulation rate Wco and the actual weight circulation rate Wcd.

As described above, the refrigeration cycle apparatus 104 according to the fourth embodiment is provided with the stroke detector 9 for detecting the stroke length of the piston that reciprocates in the linear compressor 1a; the top dead point detector 10 for detecting the top dead point of the piston that reciprocates in the linear compressor 1a; and the discharge refrigerant concentration detector 13 for detecting the concentration of the refrigerant discharged from the linear compressor 1a. The refrigeration cycle apparatus 104 so constructed calculates the actual weight circulation rate of the refrigerant that circulates in the refrigeration cycle, on the basis of the stroke length and top dead point of the piston, the concentration of the refrigerant discharged from the linear compressor 1a, and the frequency of the output AC current from the inverter 2 which is the driving current for the linear compressor 1a. Therefore, the refrigerating capacity of the refrigeration cycle apparatus using the linear compressor, which is an air conditioner for cooling a room, can be controlled with high efficiency on the basis of the temperature difference between the actual temperature of the room to be cooled and the target temperature, as described for the third embodiment. Moreover, a fluid sensor for measuring the actual weight circulation rate of the refrigerant can be dispensed with.

While in this fourth embodiment the discharge refrigerant concentration detector 13 is a concentration sensor using an optical fiber, the discharge refrigerant concentration detector 13 may obtain the concentration of the discharged refrigerant from the temperature and pressure of the discharged refrigerant. In this case, the refrigerating capacity of the refrigeration cycle apparatus can be efficiently controlled without using a sensor for measuring the concentration of the discharged refrigerant.

Furthermore, as a concrete method for obtaining the concentration of the discharged refrigerant from the temperature and pressure thereof, it may be calculated from the state equation of the refrigerant, or it may be obtained from a table in which a refrigerant concentration is assigned to each combination of a refrigerant temperature and a refrigerant pressure. The temperature of the discharged refrigerant can be obtained from an output of a temperature sensor which is attached to the discharge port of the linear compressor 1a as a protection sensor for the linear compressor 1a. Further, the pressure of the discharged refrigerant can be obtained from an output of a pressure sensor which is attached to the discharge side of the linear compressor 1a. Further, as already described for the second embodiment, the pressure of the discharged refrigerant can be obtained as a pressure at which the refrigerant is saturated, from the temperature of the heat exchanger that is placed on the discharge side of the linear compressor 1a and acts as a condenser, between the first heat exchanger and the second heat exchanger constituting the refrigeration cycle.

[Embodiment 5]

Figure 6:
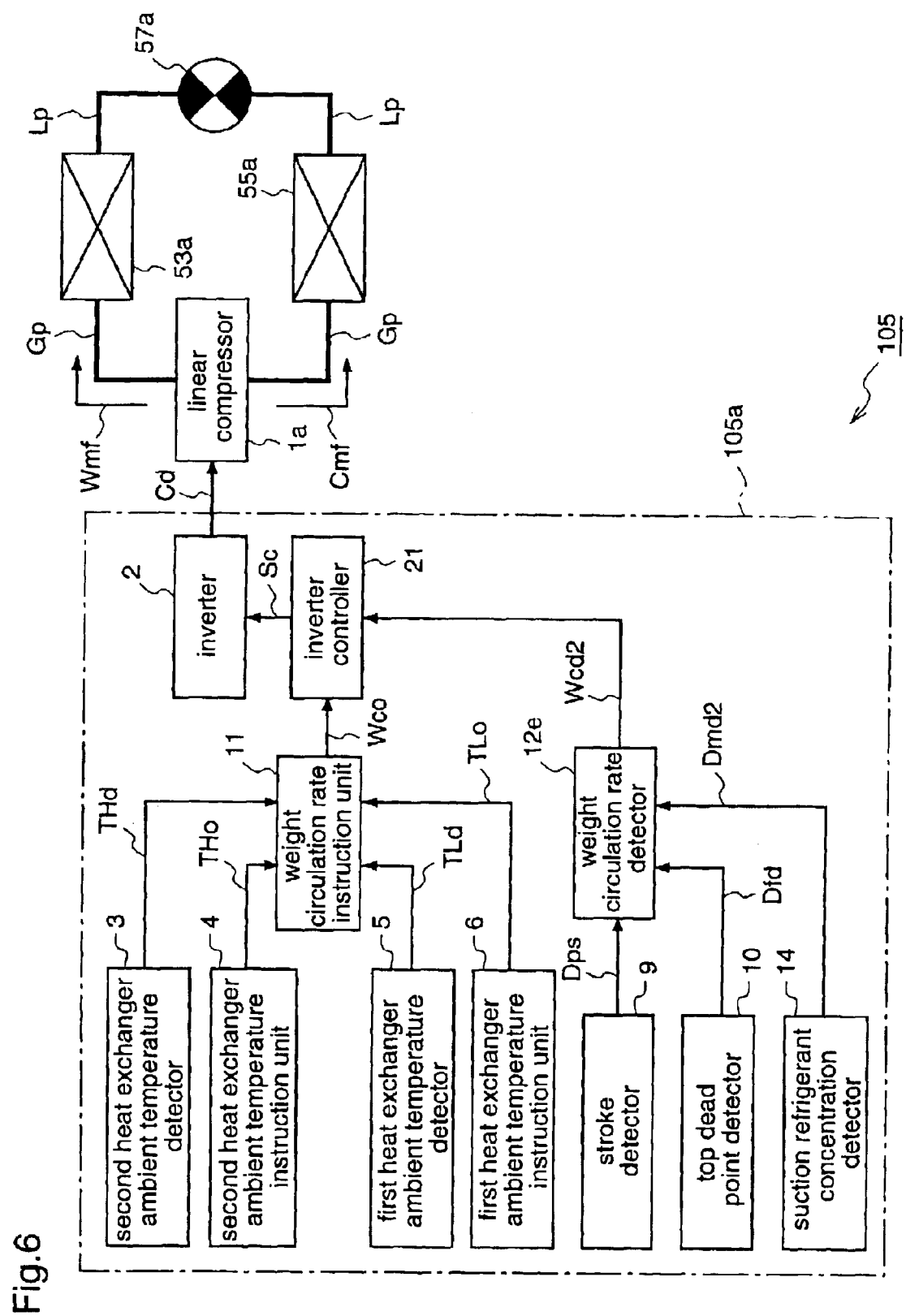
FIG. 6 is a block diagram for explaining a refrigeration cycle apparatus according to a fifth embodiment of the present invention.

FIG. 6 is a block diagram for explaining a refrigeration cycle apparatus according to a fifth embodiment of the present invention.

A refrigeration cycle apparatus 105 according to the fifth embodiment is provided with a linear compressor driving unit 105a for calculating the actual weight circulation rate of the refrigerant on the basis of the concentration of the refrigerant sucked into the linear compressor 1a, instead of the linear compressor driving unit 104a of the fourth embodiment which calculates the actual weight circulation rate of the refrigerant on the basis of the concentration of the refrigerant discharged from the linear compressor 1a. The other constituents are identical to those of the fourth embodiment.

To be specific, the linear compressor driving unit 105a comprises a second heat exchanger ambient temperature detector 3, a first heat exchanger ambient temperature detector 5, a second heat exchanger ambient temperature instruction unit 4, a first heat exchanger ambient temperature instruction unit 6, a stroke detector 9, a top dead point detector 10, a weight circulation rate instruction unit 11, an inverter 2, and an inverter controller 21, as described for the fourth embodiment of the invention.

The linear compressor driving unit 105a includes a suction refrigerant concentration detector 14 for detecting the concentration Dmd2 of the refrigerant sucked into the linear compressor 1a; and a weight circulation rate detector 12e for calculating the actual weight circulation rate Wcd of the refrigerant in the linear compressor 1a on the basis of the piston stroke length Dps, the top dead point Dfd, and the suction refrigerant concentration Dmd2. The suction refrigerant concentration detector 14 is implemented by a concentration sensor using an optical fiber or the like.

Next, the operation of the refrigeration cycle apparatus 105 according to the fifth embodiment will be described.

The refrigeration cycle apparatus 105 is different from the fourth embodiment only in the operation for calculating the actual weight circulation rate of the refrigerant, and therefore, the operation for calculating the actual weight circulation rate will be mainly described hereinafter.

Under the state where the linear compressor 1a is driven and the refrigerant is circulating in the circulation path, the stroke detector 9 detects the piston stroke length Dps in the operating linear compressor 1a, and outputs a detection signal indicating the stroke length (stroke information) to the weight circulation rate detector 12e. Further, the top dead point detector 10 detects the top dead point Dfd of the piston in operating linear compressor 1a, and outputs a detection signal indicating the top dead point (top dead point information) to the weight circulation rate detector 12e. Further, the suction refrigerant concentration detector 14 detects the concentration Dmd2 of the refrigerant sucked into the linear compressor 1a, and outputs a detection signal indicating the refrigerant concentration (concentration information) to the weight circulation rate detector 12e.

Then, the weight circulation rate detector 12e obtains the volume of the refrigerant which is sucked into the linear compressor 1a per piston reciprocating motion, on the basis of the stroke length and top dead point of the piston, in a manner similar to the volume circulation rate detector 8b of the refrigeration cycle apparatus 102 according to the second embodiment. Further, the weight circulation rate detector 12e performs multiplication of the obtained volume of the suction refrigerant per piston reciprocating motion by the detected concentration of the suction refrigerant, thereby to calculate the weight of the refrigerant sucked by each piston reciprocating motion. Then, the weight circulation rate detector 12e performs multiplication of the weight of the refrigerant sucked per piston reciprocation motion by the frequency of the output current from the inverter to obtain the weight Wcd of the refrigerant sucked into the linear compressor per unit time, and outputs a detection signal indicating this weight (circulation rate information) to the inverter controller 21.

Then, the inverter controller 21 outputs a control signal Sc to the inverter 2, whereby the AC current generating operation of the inverter 2 is controlled on the basis of the control signal Sc so as to decrease a difference between the required weight circulation rate Wco and the actual weight circulation rate Wcd.

As described above, the refrigeration cycle apparatus 105 according to the fifth embodiment is provided with the stroke detector 9 for detecting the stroke length Dps of the piston that reciprocates in the linear compressor 1a; the top dead point detector 10 for detecting the top dead point Dfd of the piston that reciprocates in the linear compressor 1a; and the suction refrigerant concentration detector 14 for detecting the concentration Dmd2 of the refrigerant sucked into the linear compressor 1a. The refrigeration cycle apparatus 105 so constructed calculates the actual weight circulation rate of the refrigerant that circulates in the refrigeration cycle, on the basis of the stroke length and top dead point of the piston, the concentration of the refrigerant sucked into the linear compressor 1a, and the frequency of the output AC current from the inverter 2, which is the driving current for the linear compressor 1a. Therefore, the refrigerating capacity of the refrigeration cycle apparatus using the linear compressor, which is an air conditioner for cooling a room, can be controlled with high efficiency on the basis of the temperature difference between the actual temperature of the room to be cooled and the target temperature, as described for the third embodiment. Moreover, a fluid sensor for measuring the actual weight circulation rate can be dispensed with. For example, even when the pressure of the discharged refrigerant is so high that the concentration thereof cannot be detected, the refrigerating capacity of the refrigeration cycle apparatus can be efficiently controlled on the basis of the weight circulation rate of the refrigerant, using only the sensor for measuring the concentration of the sucked refrigerant, without using the sensor for measuring the weight circulation rate.

While in this fifth embodiment the suction refrigerant concentration detector 14 is a concentration sensor using an optical fiber, the suction refrigerant concentration detector 14 may obtain the concentration of the sucked refrigerant from the temperature and pressure thereof.

In this case, when the pressure of the sucked refrigerant is too high to be detected, the refrigerating capacity of the refrigeration cycle apparatus can be efficiently controlled on the basis of the weight circulation rate of the refrigerant without using a sensor for measuring the concentration of the sucked refrigerant.

Furthermore, as a concrete method for obtaining the concentration of the sucked refrigerant from the temperature and pressure thereof, it may be obtained using the state equation of the refrigerant, or it may be obtained using a table in which a refrigerant concentration is assigned to each combination of a refrigerant temperature and refrigerant pressure.

The temperature of the sucked refrigerant can be obtained from an output of a temperature sensor which is attached to the discharge port of the linear compressor 1a, and the pressure of the sucked refrigerant can be obtained from an output of a pressure sensor which is attached to the suction side of the linear compressor 1a. Further, as already described for the second embodiment, the pressure of the sucked refrigerant can be obtained as a pressure at which the refrigerant is saturated, from the temperature of the heat exchanger that is placed on the suction side of the linear compressor 1a and acts as an evaporator, between the first heat exchanger and the second heat exchanger constituting the refrigeration cycle. Furthermore, the method for detecting the temperature of the sucked refrigerant is not restricted to the above-mentioned method using the temperature sensor attached to the suction port of the linear compressor 1a. For example, the temperature of the sucked refrigerant may be obtained as follows. Initially, the super heat relating to the refrigeration cycle (i.e., a temperature difference between the temperature of the refrigerant sucked into the linear compressor and the saturation temperature thereof) is estimated, and the temperature of the sucked refrigerant is estimated from the sum of the super heat and the temperature of the heat exchanger acting as an evaporator. In this case, even when the pressure of the discharge refrigerant is too high to be detected, the refrigerating capacity of the refrigeration cycle apparatus can be controlled with high efficiency on the basis of the weight circulation rate of the refrigerant which is closely related to the load on the refrigeration cycle apparatus, without using a sensor for measuring the concentration of the sucked refrigerant and a sensor for measuring the temperature of the sucked refrigerant.

[Embodiment 6]

Figure 7:
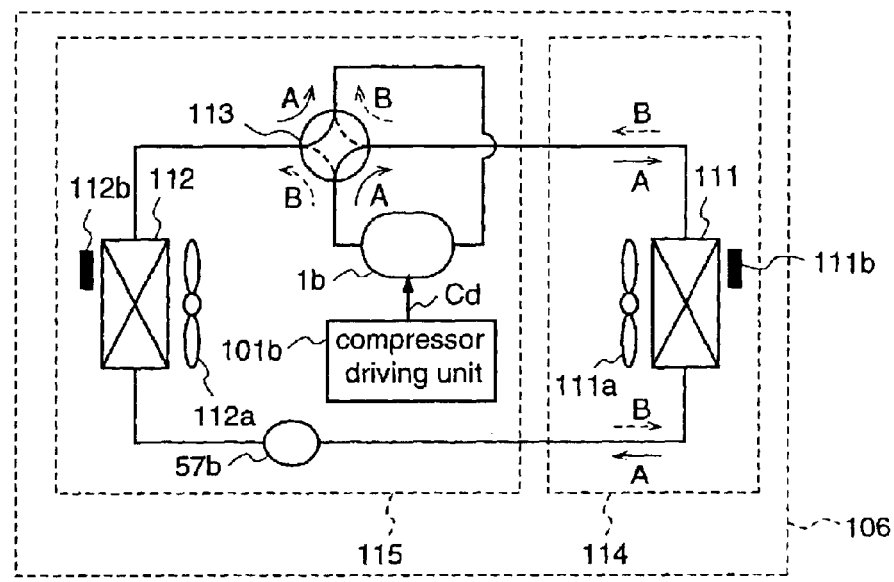
FIG. 7 is a schematic diagram illustrating an air conditioner according to a sixth embodiment of the present invention.

FIG. 7 is a block diagram for explaining an air conditioner according to a sixth embodiment of the present invention.

An air conditioner 106 according to the sixth embodiment has an indoor unit 114 and an outdoor unit 115, and performs cooling and heating. The air conditioner 106 is different from the air conditioner 101 of the first embodiment in that it has a four-way valve 113 for changing the direction in which a refrigerant flows in a refrigerant circulation path.

To be specific, the air conditioner 106 is provided with a linear compressor 1b for forming a refrigerant circulation path, a restrictor 57b, a first heat exchanger 111, a second heat exchanger 112, and a compressor driving unit 101b for driving the linear compressor 1b, as described for the air conditioner 101a of the first embodiment. The first heat exchanger 111 constitutes the indoor unit 114, while the restrictor 57b, the second heat exchanger 112, the linear compressor 1b, the four-way valve 113, and the compressor driving unit 101b constitute the outdoor unit 115. The linear compressor 1b, the compressor driving unit 101b, and the restrictor 57b are identical to the linear compressor 1a, the compressor driving unit 101a, and the restrictor 57a which are constituents of the refrigeration cycle apparatus (air conditioner) 101a of the first embodiment.

Further, the first heat exchanger 111 is an indoor heat exchanger placed in a room, and this heat exchanger 111 corresponds to the first heat exchanger (evaporator) 53a of the air conditioner 101a performing cooling, according to the first embodiment. The second heat exchanger 112 is an outdoor heat exchanger placed outside the room, and this heat exchanger 112 corresponds to the second heat exchanger (condenser) 55a of the air conditioner 101a performing cooling. The indoor heat exchanger 111 has a fan for increasing the efficiency of heat exchange, and a temperature sensor 111b for measuring the temperature of the heat exchanger 111 or the ambient temperature thereof. The temperature sensor 111b corresponds to the first heat exchanger ambient temperature detector 3 of the first embodiment. The outdoor heat exchanger 112 has a fan 112a for increasing the efficiency of heat exchange, and a temperature sensor 112b for measuring the temperature of the heat exchanger 112 or the ambient temperature thereof. The temperature sensor 112b corresponds to the second heat exchanger ambient temperature detector 3 of the first embodiment.

In this sixth embodiment, the compressor 1b and the four-way valve 113 are placed in the refrigerant path between the first heat exchanger 111 and the second heat exchanger 112. That is, in this air conditioner 106, the four-way valve 113 selects either of two states as follows: a first state in which the refrigerant that has passed through the second heat exchanger 112 is sucked into the compressor 1b, and the refrigerant discharged from the compressor 1b is supplied to the first heat exchanger 111 (i.e., a state in which the refrigerant flows in the direction of arrow A), and a second state in which the refrigerant that has passed through the first heat exchanger 111 is sucked into the compressor 1b, and the refrigerant discharged from the compressor 1b is supplied to the second heat exchanger 112 (i.e., a state in which the refrigerant flows in the direction of arrow B).

Further, the restrictor 57b has both the function of restricting the flow rate of the circulating refrigerant, and the function of a valve for automatically controlling the flow rate of the refrigerant (automatic control valve). That is, under the state where the refrigerant is circulating in the refrigerant circulation path, the restrictor 57b restricts the flow rate of the liquid refrigerant outputted from the condenser to the evaporator to expand the liquid refrigerant, and supplies a proper amount of refrigerant that is required for the evaporator.

Next, the operation of the air conditioner 106 will be described.

In the air conditioner 106 according to the sixth embodiment, when a driving current Cd is supplied from the compressor driving unit 101b to the linear compressor 1b, the refrigerant circulates in the refrigerant circulation path, and heat exchange is carried out in the first heat exchanger 111 of the indoor unit 114 and the second heat exchanger 112 of the outdoor unit 115. Thereby, heating or cooling of the room is carried out.

For example, when the air conditioner 116 performs heating, the four-way valve 113 is set by user operation so that the refrigerant flows in the direction of arrow A. In this case, by the circulation of the refrigerant in the refrigerant circulation path, the first heat exchanger (indoor heat exchanger) 111 operates as a condenser, and discharges heat. Thereby, the room is heated.

Conversely, when the air conditioner 116 performs cooling, the four-way valve 113 is set by user operation so that the refrigerant flows in the direction of arrow B. In this case, by the circulation of the refrigerant in the refrigerant circulation path, the first heat exchanger (indoor heat exchanger) 111 operates as an evaporator, and absorbs heat from the ambient air. Thereby the room is cooled.

As described above, in the air conditioner 106 according to the sixth embodiment, like the air conditioner 101 of the first embodiment, the volume circulation rate Vco of the refrigerant required of the air conditioner 106 is calculated on the basis of not only the indoor temperature (the ambient temperature of the first heat exchanger 111) but also the outdoor temperature (the ambient temperature of the second heat exchanger 112). Therefore, the calculated value of the required volume circulation rate becomes more adaptable to the driving state.

That is, a driving state that disturbs comfort, such that the air conditioner excessively cools or heats the room, can be avoided. For example, the room temperature can be brought to the set temperature in a shorter time.

Moreover, since the driving state that disturbs comfort is prevented, excess power is not used for driving the air conditioner, resulting in highly efficient driving.

[Embodiment 7]

FIG. 8 is a block diagram for explaining a refrigerator according to a seventh embodiment of the present invention.

A refrigerator 107 of this seventh embodiment employs the refrigeration cycle apparatus 101 according to the first embodiment, and comprises a linear compressor 1c for forming a refrigerant circulation path, a restrictor 57c, a first heat exchanger 122, a second heat exchanger 121, and a compressor driving unit 101c for driving the linear compressor 1c.

That is, the restrictor 57c, the linear compressor 1c, and the compressor driving unit 101c are identical to the restrictor 57a, the linear compressor 1a, and the compressor driving unit 101a according to the first embodiment, respectively.

Further, the second heat exchanger 121 is a condenser for discharging heat to the air, and corresponds to the second heat exchanger (condenser) 55a of the air conditioner 101a performing cooling, according to the first embodiment. The first heat exchanger 122 is an evaporator placed in a refrigeration chamber (i.e., inside the refrigerator), for cooling the inside of the refrigerator, and it corresponds to the first heat exchanger (evaporator) 53a of the air conditioner 101a. The evaporator 122 has a fan 122a for increasing the efficiency of heat exchange, and a temperature sensor 122b for detecting the temperature of the inside of the refrigerator. The temperature sensor 122b corresponds to the heat exchanger ambient temperature detector 3 of the first embodiment.

Next, the operation of the refrigerator 107 will be described.

In the refrigerator 107, when a driving current Cd is supplied from the compressor driving unit 101c to the linear compressor 1c, the refrigerant circulates in the refrigerant circulation path in the direction of arrow C, and heat exchange is carried out in the condenser 121 and the evaporator 122. Thereby, the inside of the refrigerator is cooled.

To be specific, the refrigerant is liquefied by the second heat exchanger (condenser) 121, and the flow rate of the refrigerant is reduced by the restrictor 57c, whereby the refrigerant expands, resulting in a low-temperature liquid refrigerant. When the low-temperature liquid refrigerant is sent to the first heat exchanger (evaporator) 122, the low-temperature liquid refrigerant is evaporated, whereby the refrigeration chamber is cooled. At this time, the air in the refrigeration chamber is sent to the heat exchanger 122 by the fan 122a, whereby heat exchange is efficiently carried out in the heat exchanger 122. Further, the inside temperature of the refrigerator is detected by the temperature sensor 122b, and a detection signal is output to the compressor driving unit 10c. The compressor driving unit calculates a volume circulation rate Vco of the refrigerant which is required of the refrigeration cycle apparatus, on the basis of the temperature information detected by the sensor 122b, and drive-controls the linear compressor 1c on the basis of the calculated volume circulation rate.

As described above, in the refrigerator 107 according to the seventh embodiment, like the air conditioner 101 according to the first embodiment, the volume circulation rate Vco of the refrigerant that is required of the refrigerator is calculated on the basis of the inside temperature of the refrigerator (the ambient temperature of the first heat exchanger 122), whereby the calculated value of the requested volume circulation rate becomes more adaptable to the driving state.

That is, in this seventh embodiment, an insufficient driving state such that the inside of the refrigerator is excessively cooled can be avoided. For example, the temperature in the refrigerator can be brought to the set temperature in a shorter time.

[Embodiment 8]

Figure 9:
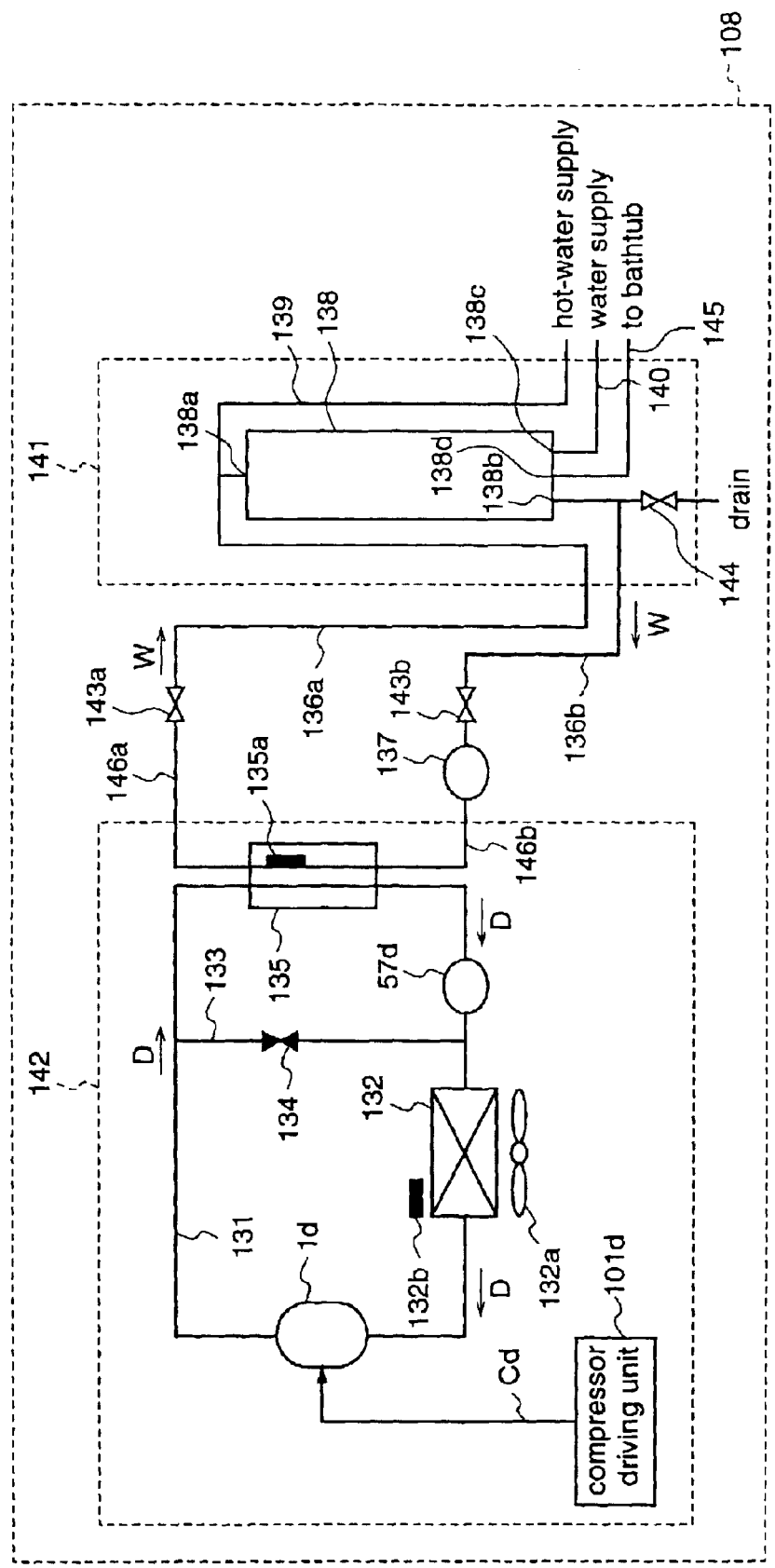
FIG. 9 is a schematic diagram illustrating a hot-water supply unit according to an eighth embodiment of the present invention.

FIG. 9 is a block diagram for explaining a hot-water supply unit according to an eighth embodiment of the present invention.

A hot-water supply unit 108 according to the eighth embodiment is provided with a refrigeration cycle apparatus 142 for heating supplied water to discharge hot water, and a hot-water storage 141 in which the hot water discharged from the refrigeration cycle apparatus 142 is stored.

The refrigeration cycle apparatus 142 comprises a linear compressor 1d for forming a refrigerant circulation path, a restrictor 57d, a first heat exchanger 132, a second heat exchanger 135, and a compressor driving unit 101d for driving the linear compressor 1d, as described for the refrigeration cycle apparatus 101 according to the first embodiment.

That is, the restrictor 57d, the linear compressor 1d, and the compressor driving unit 101d are identical to the restrictor 57a, the linear compressor 1a, and the compressor driving unit 101a according to the first embodiment, respectively.

The second heat exchanger 135 is a water heat exchanger for heating the water supplied to the refrigeration cycle apparatus 142, and corresponds to the second heat exchanger (condenser) 55a of the air conditioner 101a performing cooling according to the first embodiment. The first heat exchanger 132 is an air heat exchanger for absorbing heat from the surrounding atmosphere, and corresponds to the first heat exchanger (evaporator) 53a of the air conditioner 101a. The water heat exchanger 135 has a temperature sensor 135a for detecting the temperature of the heated water (hot water), and this temperature sensor 135a corresponds to the second heat exchanger ambient temperature detector 5 according to the first embodiment. The air heat exchanger 132 has a fan 132a for increasing the efficiency of heat exchange, and a temperature sensor 132b for detecting the ambient temperature. The temperature sensor 132b corresponds to the first heat exchanger ambient temperature detector 3 according to the first embodiment.

In FIG. 9, reference numeral 131 denotes a refrigerant pipe for making the refrigerant circulate along the refrigerant circulation path that is formed by the linear compressor 1d, the first heat exchanger 132, the restrictor 57d, and the second heat exchanger 135. A bypass pipe (defrost bypass line) 133 for supplying the refrigerant discharged from the compressor 1d to the first heat exchange 132, bypassing the second heat exchanger 135 and the restrictor 57d, is connected to the refrigerant pipe 131, and a valve (defrost bypass valve) 134 is provided in a portion of the bypass pipe 133.

The hot-water storage 141 has a hot-water storage tank 138 for storing water or hot water. A pipe (water supply pipe) 140 for supplying water from the outside to the storage tank 138 is connected to a water intake port 138c of the storage tank 138, and a pipe (hot-water supply pipe) 140 for supplying hot-water from the storage tank 138 to a bathtub is connected to a hot-water discharge port of the storage tank 138. Further, a hot-water supply pipe 139 for supplying the hot water stored in the storage tank 138 to the outside is connected to a water intake/discharge port 138a of the storage tank 138.

The storage tank 138 and the water heat exchanger 135 of the refrigeration cycle apparatus 142 are connected by pipes 136a, 136b, 146a, and 146b, and a water circulation path is formed between the storage tank 138 and the water heat exchanger 135.

The water supply pipe 136b is a pipe for supplying water from the storage tank 138 to the water heat exchanger 135, and an end of this pipe is connected to a water discharge port 138b of the storage tank 138 while the other end is connected to a water intake side pipe 146b of the water heat exchanger 135 through a joint 143b. Further, a discharge valve 144 for discharging the water or hot water stored in the storage tank 138 is fixed to an end of the water supply pipe 136b. The water supply pipe 136a is a pipe for returning the water from the water heat exchanger 135 to the storage tank 138, and an end of this pipe is connected to the water intake/discharge port 138a of the storage tank 138 while the other end is connected to a discharge side pipe 146a of the water heat exchanger 135 through a joint 143a.

A pump 137 for circulating the water in the water circulation path is provided in a portion of the water intake side pipe 146b of the water heat exchanger 135.

Next, the operation of the hot-water supply unit 108 will be described.

When a driving current Cd is supplied from the compressor driving unit 101d to the linear compressor 1d to drive the linear compressor 1d, the high-temperature refrigerant compressed by the linear compressor 1d circulates in the direction of arrow D (i.e., travels through the refrigerant pipe 131, to be supplied to the second heat exchanger (water heat exchanger) 135). Further, when the pump 137 in the water circulation path is driven, water is supplied from the storage tank 138 to the second heat exchanger.

In the second heat exchanger (water heat exchanger) 135, heat exchange is carried out between the refrigerant and the water supplied from the storage tank 138, and heat moves from the refrigerant to the water. That is, the supplied water is heated, and the heated water (hot water) is supplied to the storage tank 138. At this time, the temperature of the heated water (hot water) is observed by the temperature sensor 135a.

Further, in the second heat exchanger (water heat exchanger), the refrigerant is condensed by the above-mentioned heat exchange, and the flow rate of the condensed liquid refrigerant is reduced by the restrictor 57d, whereby the refrigerant is expanded and sent to the first heat exchanger (air heat exchanger) 132. In the hot-water supply unit 108, the first heat exchanger (air heat exchanger) 132 serves as an evaporator. That is, the air heat exchanger 132 absorbs heat from the outside air that is sent by the fan 132b, and evaporates the low-temperature liquid refrigerant. At this time, the temperature of the surrounding atmosphere of the air heat exchanger 132 is observed by the temperature sensor 132b.

Further, in the refrigeration cycle apparatus 142, when the first heat exchanger (air heat exchanger) 132 is frosted, the defrost bypass valve 134 opens, and the high-temperature refrigerant is supplied to the first heat exchanger (air heat exchanger) 132 through the defrost bypass line 133. Thereby, the first heat exchanger (air heat exchanger) 132 is defrosted.

On the other hand, the hot water is supplied from the water heat exchanger 135 of the refrigeration cycle apparatus 108 to the hot-water storage 141 through the pipes 146a and 136a, and the supplied hot water is stored in the storage tank 138. The hot water in the storage tank 138 is supplied to the outside through the hot-water supply pipe 139 as required. Especially when the hot water is supplied to a bathtub, the hot water in the storage tank is supplied to the bathtub through a hot-water supply tube 140 for the bathtub.

Further, when the amount of the water or hot water stored in the storage tank 138 becomes lower than a predetermined amount, water is supplied from the outside through the water supply pipe 140.

As described above, in the hot-water supply unit 108 according to the eighth embodiment, like the air conditioner 101 of the first embodiment, a volume circulation rate Vco of the refrigerant that is required of the refrigeration cycle apparatus of the hot-water supply unit is calculated on the basis of the temperature of the hot water supplied from the hot-water supply unit 108, which temperature is detected by the temperature sensor 135a. Therefore, the calculated value of the requested volume circulation rate becomes more adaptable to the driving state of the hot-water supply unit.

That is, an insufficient driving state such that the hot-water supply unit excessively heats the water can be avoided. For example, the temperature of the water supplied from the hot-water supply unit can be brought to the set temperature in a shorter time.

[Embodiment 9]

Figure 10:
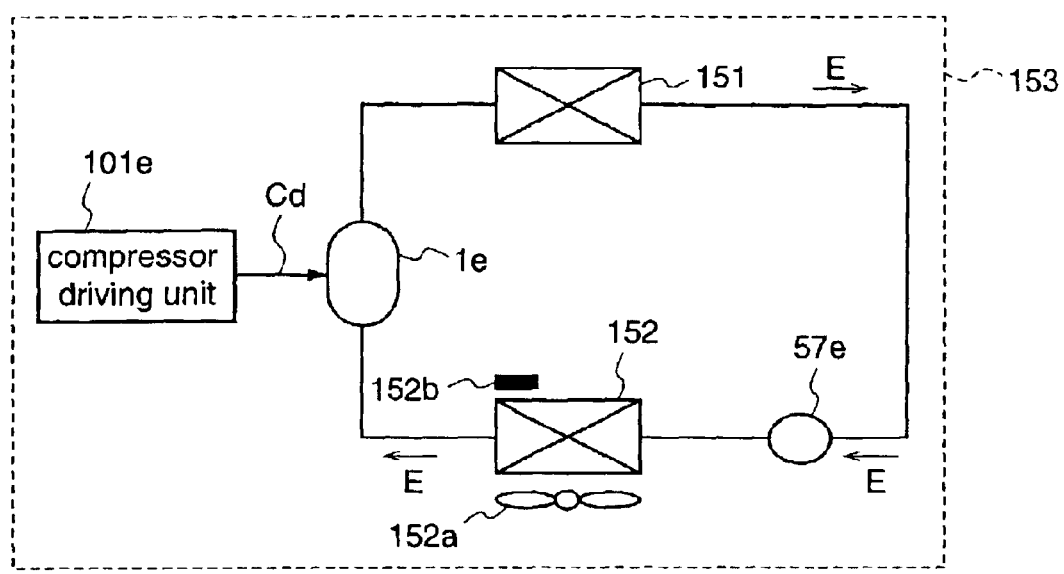
FIG. 10 is a schematic diagram illustrating a cryogenic freezer according to a ninth embodiment of the present invention.

FIG. 10 is a block diagram for explaining a cryogenic freezer according to a ninth embodiment of the present invention.

A cryogenic freezer 109 according to the ninth embodiment has a freezing chamber, and cools the inside of the chamber at a cryogenic temperature (lower than −50° C.). Objects to be cooled by the cryogenic freezer include superconducting elements (electromagnetic circuit elements such as resistors, coils, magnets), electronic elements such as low-temperature reference parts for infrared sensors, medical objects such as blood and viscera, and frozen foods such as frozen tunas.

Electronic elements are set in the cryogenic states to increase the operating efficiency, or the sensitivity by removing thermal noises. As for foods, perishable foods are set in the cryogenic states to facilitate transportation, maintain freshness, or perform freeze-dry.

The cooling temperature of the cryogenic freezer is set to about 50~100K (K: absolute temperature) when used for high-temperature superconducting, and it is set to about 0~50K when used for normal superconducting. Further, it is set to almost −50° C. (centigrade) when used for maintaining freshness of foods or the like.

Hereinafter, the cryogenic freezer 109 will be described in more detail.

The cryogenic freezer 109 employs the refrigeration cycle apparatus 101 according to the first embodiment, and comprises a linear compressor 1e for forming a refrigerant circulation path, a restrictor 57e, a first heat exchanger 152, a second heat exchanger 151, and a compressor driving unit 101e for driving the linear compressor 1e.

That is, the restrictor 57e, the linear compressor 1e, and the compressor driving unit 101e are identical to the restrictor 57a, the linear compressor 1a, and the compressor driving unit 101a according to the first embodiment, respectively.

Further, the second heat exchanger 151 is a heat radiator for discharging heat to the atmosphere, and corresponds to the condenser 55a of the air conditioner 101 performing cooling according to the first embodiment. The first heat exchanger 152 is a heat storage for cooling the inside of the freezing chamber, and corresponds to the evaporator 53a of the air conditioner 101. The heat radiator 152 has a fan 152a for increasing the efficiency of heat exchange, and a temperature sensor 152b for detecting the temperature in the freezing chamber. The temperature sensor 152b corresponds to the first heat exchanger ambient temperature detector 3 according to the first embodiment.

Next, the operation of the cryogenic freezer 109 will be described.

In the cryogenic freezer 109, when a driving current Cd is supplied from the compressor driving unit 101e to the linear compressor 1e, the refrigerant circulates in the refrigerant circulation path along the direction of arrow E, and heat exchange is carried out in the heat radiator 151 and the heat storage 152. Thereby, the freezing chamber is cooled.

That is, the refrigerant is liquefied by the second heat exchanger (heat radiator) 151, and the flow rate of the refrigerant is reduced by the restrictor 57e, whereby the refrigerant is expanded to be a low-temperature liquid refrigerant. When the low-temperature liquid refrigerant is sent to the first heat exchanger (heat storage) 152, the liquid refrigerant is evaporated, whereby the freezing chamber is cooled. At this time, the air in the freezing chamber is sent to the heat storage 152 by the fan 152a, whereby heat exchange is efficiently carried out in the heat storage 152. Further, the temperature in the freezing chamber is detected by the temperature sensor 152b, and a detection signal is output to the compressor driving unit 101e. The compressor driving unit 101e calculates a volume circulation rate vco of the refrigerant that is required of the refrigeration cycle apparatus on the basis of the temperature information detected by the temperature sensor 152b, and drive-controls the linear compressor 1e on the basis of the calculated volume circulation rate.

As described above, in the cryogenic freezer 109 according to the ninth embodiment, like the air conditioner 101 of the first embodiment, the volume circulation rate Vco of the refrigerant that is required of the refrigeration cycle apparatus is calculated on the basis of the temperature in the freezing chamber (i.e., the temperature of the object to be frozen). Therefore, the calculated value of the required volume circulation rate can be brought to a value more suitable to the driving state of the cryogenic freezer, whereby the temperature of the object to be frozen can be controlled with efficiency.

While the sixth to ninth embodiments employ the compressor driving units identical to the compressor driving unit 101a of the refrigeration cycle apparatus 101 of the first embodiment, the compressor driving units according to the sixth to ninth embodiments are not restricted to that of the first embodiment, and any of the compressor driving units 102a to 105a according to the second to fifth embodiments may be employed.

What is claimed is:

1. A refrigeration cycle apparatus comprising:
   a first heat exchanger and a second heat exchanger which form a circulation path for a refrigerant;
   a linear compressor having a piston and having a variable-volume compression chamber;
   a linear motor for reciprocating said piston so as to circulate the refrigerant in the circulation path by the reciprocating motion of said piston;
   an inverter for generating an AC current for driving said linear motor;
   an actual circulation rate detector for detecting an actual refrigerant circulation rate indicating the volume of the refrigerant that is discharged from or sucked into said linear compressor per unit time by the reciprocating motion of said piston;
   a target circulation rate derivation unit for deriving a target refrigerant circulation rate indicating the volume of the refrigerant to be discharged from or sucked into said linear compressor per unit time, on the basis of an ambient temperature of at least one of said first heat exchanger and said second heat exchanger, and a target temperature that is set for at least one of said first heat exchanger and said second heat exchanger; and
   a controller for controlling a driving current supplied from said inverter to said linear motor to adjust a stroke length of said piston so as to adjust a volume of said variable-volume compression chamber, thereby decreasing a difference between the actual refrigerant circulation rate and the target refrigerant circulation rate.

2. A refrigeration cycle apparatus as defined in claim 1, further comprising:
   a stroke detector for detecting the stroke length of said piston; and
   a top dead point detector for detecting the top dead point of said piston; and
   wherein said actual circulation rate detector is operable to calculate the volume of the refrigerant that is discharged or sucked by each stroke of said piston, on the basis of the detected stroke length and the detected top dead point, and is operable to obtain the actual refrigerant circulation rate by multiplying the calculated volume by the frequency of the AC current generated by said inverter.

3. A refrigeration cycle apparatus as defined in claim 2, further comprising:

a discharge pressure estimation unit for estimating the pressure of the refrigerant to be discharged from said linear compressor, on the basis of the temperature of the refrigerant in one of said first heat exchanger and said second heat exchanger for condensing the refrigerant, said discharge pressure estimation unit being positioned on the refrigerant discharge side of said linear compressor; and a suction pressure estimation unit for estimating the pressure of the refrigerant to be sucked into said linear compressor, on the basis of the temperature of the refrigerant in one of said first heat exchanger and said second heat exchanger for evaporating the refrigerant, said suction pressure estimation unit being positioned on the refrigerant suction side of said linear compressor; and wherein said actual circulation rate detector is operable to perform an arithmetic operation using a pressure ratio between a maximum pressure and a minimum pressure of the refrigerant in the circulation path, which is obtained from the estimated pressure of the refrigerant to be sucked and the estimated pressure of the refrigerant to be discharged, and the detected stroke length and the detected top dead point, thereby to obtain the volume of the refrigerant to be discharged or sucked by each stroke of said piston.

4. An air conditioner having a refrigeration cycle apparatus as defined in claim 1, wherein said first heat exchanger is an outdoor heat exchanger, and said second heat exchanger is an indoor heat exchanger.

5. A refrigerator having a refrigeration cycle apparatus as defined in claim 1, wherein said first heat exchanger is a condenser for discharging heat, and said second heat exchanger is an evaporator for cooling the inside of the refrigerator.

6. A hot-water supply unit having a refrigeration cycle apparatus as defined in claim 1, including a storage tank for storing water, wherein said first heat exchanger is a water heat exchanger for heating the water stored in said storage tank, and wherein said second heat exchanger is an air heat exchanger for absorbing heat from the surrounding atmosphere.

7. A cryogenic freezer having a refrigeration cycle apparatus as defined in claim 1, including a freezing chamber, wherein said first heat exchanger is a heat radiator for radiating heat, and wherein said second heat exchanger is a heat storage for cooling the inside of said freezing chamber.

8. A refrigeration cycle apparatus comprising:

a first heat exchanger and a second heat exchanger which form a circulation path for a refrigerant;

a linear compressor having a piston and having a variable-volume compression chamber;

a linear motor for reciprocating said piston so as to circulate the refrigerant in the circulation path by the reciprocating motion of said piston;

an inverter for generating an AC current for driving said linear motor;

an actual circulation rate detector for detecting an actual refrigerant circulation rate indicating the weight of the refrigerant that is discharged from or sucked into said linear compressor per unit time by the reciprocating motion of said piston;

a target circulation rate derivation unit for deriving a target refrigerant circulation rate indicating the weight of the refrigerant to be discharged from or sucked into said linear compressor per unit time, on the basis of an ambient temperature of at least one of said first heat exchanger and said second heat exchanger, and a target temperature that is set for at least one of said first heat exchanger and said second heat exchanger; and a controller for controlling a driving current supplied from said inverter to said linear motor to adjust a stroke length of said piston so as to adjust a volume of said variable-volume compression chamber, thereby decreasing a difference between the actual refrigerant circulation rate and the target refrigerant circulation rate.

9. A refrigeration cycle apparatus as defined in claim 8, further comprising:

a stroke detector for detecting the stroke length of said piston;

a top dead point detector for detecting the top dead point of said piston; and a discharge refrigerant concentration detector for detecting the concentration of the refrigerant discharged from said linear compressor; and wherein said actual circulation rate detector is operable to calculate the volume of the refrigerant that is discharged by each stroke of said piston, on the basis of the detected stroke length and the detected top dead point, and is operable to obtain the weight of the refrigerant that is discharged from said linear compressor per unit time, on the basis of the calculated volume, the detected concentration of the refrigerant, and the frequency of the AC current generated by said inverter.

10. A refrigeration cycle apparatus as defined in claim 9, further comprising:

a discharge temperature detector for detecting the temperature of the refrigerant discharged from said linear compressor; and a discharge pressure detector for detecting the pressure of the refrigerant discharged from said linear compressor; and wherein said discharge refrigerant concentration detector is operable to derive the concentration of the refrigerant discharged from said linear compressor, on the basis of the detected temperature and the detected pressure of the refrigerant.

11. A refrigeration cycle apparatus as defined in claim 8, further comprising:

a stroke detector for detecting the stroke length of said piston;

a top dead point detector for detecting the top dead point of said piston; and a discharge refrigerant concentration detector for detecting the concentration of the refrigerant discharged from said linear compressor; and wherein said actual circulation rate detector is operable to calculate the volume of the refrigerant that is discharged by each stroke of said piston, on the basis of the detected stroke length and the detected top dead point, and is operable to obtain the weight of the refrigerant sucked into said linear compressor per unit time, on the basis of the calculated volume, the detected concentration of the refrigerant, and the frequency of the AC current generated by said inverter.

12. A refrigeration cycle apparatus as defined in claim 11, further comprising:

a suction temperature detector for detecting the temperature of the refrigerant sucked into said linear compressor; and a suction pressure detector for detecting the pressure of the refrigerant sucked into said linear compressor; and wherein said suction refrigerant concentration detector is operable to obtain the concentration of the refrigerant sucked into said linear compressor, on the basis of the detected temperature and the detected pressure of the refrigerant.

13. A refrigeration cycle apparatus as defined in claim 12, further comprising:

a refrigerant temperature detector for detecting the temperature of the refrigerant in an evaporator which is one of said first heat exchanger and said second heat exchanger for evaporating the refrigerant, the detected temperature being a saturation temperature of the refrigerant sucked into said linear compressor, said refrigerant temperature detector being positioned at the refrigerant suction side of said linear compressor in the circulation path; and a super heat estimation unit for estimating the super heat of the refrigerant, the super heat of the refrigerant being a temperature difference between the temperature of the refrigerant sucked into said linear compressor and the saturation temperature thereof, on the basis of the operating state of said linear compressor; and wherein said suction temperature detector is operable to obtain the temperature of the refrigerant sucked into said linear compressor, by adding the detected temperature of the refrigerant in said evaporator and the estimated degree of heating of the refrigerant.

14. An air conditioner having a refrigeration cycle apparatus as defined in claim 8, wherein said first heat exchanger is an outdoor heat exchanger, and said second heat exchanger is an indoor heat exchanger.

15. A refrigerator having a refrigeration cycle apparatus as defined in claim 8, wherein said first heat exchanger is a condenser for discharging heat, and said second heat exchanger is an evaporator for cooling the inside of the refrigerator.

16. A hot-water supply unit having a refrigeration cycle apparatus as defined in claim 8, including a storage tank for storing water, wherein said first heat exchanger is a water heat exchanger for heating the water stored in said storage tank, and said second heat exchanger is an air heat exchanger for absorbing heat from the surrounding atmosphere.

17. A cryogenic freezer having a refrigeration cycle apparatus as defined in claim 8, including a freezing chamber, wherein said first heat exchanger is a heat radiator for radiating heat, and wherein said second heat exchanger is a heat storage for cooling the inside of said freezing chamber.

* * * * *